United States Patent
Take

(10) Patent No.: US 8,437,088 B2
(45) Date of Patent: May 7, 2013

(54) ZOOM LENS, OPTICAL APPARATUS, AND METHOD FOR FORMING AN IMAGE OF AN OBJECT

(75) Inventor: Toshinori Take, Yokohama (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 13/027,724

(22) Filed: Feb. 15, 2011

(65) Prior Publication Data
US 2011/0134529 A1    Jun. 9, 2011

Related U.S. Application Data

(62) Division of application No. 12/044,914, filed on Mar. 7, 2008, now Pat. No. 7,911,706.

(30) Foreign Application Priority Data

Mar. 9, 2007    (JP) .................. 2007-061055
Apr. 5, 2007    (JP) .................. 2007-099530

(51) Int. Cl.
    *G02B 15/14*    (2006.01)
(52) U.S. Cl.
    USPC ................ 359/676; 359/687; 359/726
(58) Field of Classification Search ............ 359/687, 359/690, 692
    See application file for complete search history.

(56) References Cited

U.S. PATENT DOCUMENTS

| | | | |
|---|---|---|---|
| 6,091,551 A | 7/2000 | Watanabe | |
| 6,141,156 A | 10/2000 | Aoki | |
| 6,538,824 B1 | 3/2003 | Mihara et al. | |
| 6,754,446 B2 * | 6/2004 | Hagimori et al. | 396/72 |
| 7,068,429 B1 | 6/2006 | Ori | |
| 7,139,130 B2 | 11/2006 | Yamada | |
| 7,274,516 B2 | 9/2007 | Kushida et al. | |
| 7,327,953 B2 | 2/2008 | Tamura | |
| 7,443,607 B2 | 10/2008 | Kushida | |
| 2002/0136150 A1 | 9/2002 | Mihara et al. | |
| 2003/0161620 A1 | 8/2003 | Hagimori et al. | |

(Continued)

FOREIGN PATENT DOCUMENTS

| | | |
|---|---|---|
| CN | 1768290 A | 5/2006 |
| CN | 1849545 A | 10/2006 |

(Continued)

OTHER PUBLICATIONS

Office Action issued in Japanese Application No. 2007-099530 issued Mar. 24, 2012.

(Continued)

*Primary Examiner* — Jordan Schwartz

(74) *Attorney, Agent, or Firm* — Miles & Stockbridge P.C.

(57) ABSTRACT

In a zoom lens having a plurality of lens groups which are disposed in that order from an object, a first lens group that is disposed to closest to the object among the plurality of lens groups has positive refractive power and comprises a light path bending element which bends the path of light and a plurality of lens components which are disposed closer to the object than the light path bending element; and, where the distance on the optical axis from the surface closest to the object in the first lens group to the surface closest to the object in the light path bending element is L1 and the distance on the optical axis of the light path bending element is Lp, the conditional expression L1/Lp<1.0 is satisfied.

26 Claims, 24 Drawing Sheets

U.S. PATENT DOCUMENTS

| | | |
|---|---|---|
| 2004/0027685 A1 | 2/2004 | Mihara et al. |
| 2004/0095503 A1 | 5/2004 | Iwasawa et al. |
| 2005/0083584 A1 | 4/2005 | Ito et al. |
| 2005/0128604 A1 | 6/2005 | Kuba |
| 2005/0195482 A1 | 9/2005 | Yamada et al. |
| 2005/0259329 A1 | 11/2005 | Yagyu et al. |
| 2005/0270646 A1 | 12/2005 | Yamada et al. |
| 2006/0274426 A1 | 12/2006 | Sueyoshi |
| 2006/0285221 A1 | 12/2006 | Bito et al. |
| 2007/0008418 A1 | 1/2007 | Kuroda et al. |
| 2007/0070516 A1 | 3/2007 | Obama et al. |
| 2007/0115560 A1 | 5/2007 | Kushida et al. |
| 2007/0126911 A1 | 6/2007 | Nanjo |
| 2007/0279743 A1 | 12/2007 | Kushida |
| 2009/0002840 A1 | 1/2009 | Shirota |
| 2009/0141350 A1* | 6/2009 | Bito et al. ............ 359/557 |

FOREIGN PATENT DOCUMENTS

| | | |
|---|---|---|
| EP | 1 717 624 A | 11/2006 |
| EP | 1 870 757 A1 | 12/2007 |
| JP | 10-213746 A | 8/1998 |
| JP | 2000-292692 A | 10/2000 |
| JP | 2000-298235 A | 10/2000 |
| JP | 2002-303791 A | 10/2002 |
| JP | 2003-202500 A | 7/2003 |
| JP | 2004-170707 A | 6/2004 |
| JP | 2004-354869 A | 12/2004 |
| JP | 2005-084151 A | 3/2005 |
| JP | 2005-84283 A | 3/2005 |
| JP | 2005-128186 A | 5/2005 |
| JP | 2005-173191 A | 6/2005 |
| JP | 2006-113111 A | 4/2006 |
| JP | 2006-171492 A | 6/2006 |
| JP | 2006-178193 A | 7/2006 |
| JP | 2006-184430 A | 7/2006 |
| JP | 2006-195068 A | 7/2006 |
| JP | 2006-276475 A | 10/2006 |
| JP | 2007-3776 A | 1/2007 |
| JP | 2007-93984 A | 4/2007 |
| JP | 2007-139944 A | 6/2007 |
| JP | 2007-140158 A | 6/2007 |

OTHER PUBLICATIONS

Extended European Search Report and Opinion from European Patent Appln. No. 08250722, dated Jul. 31, 2008.

Extended European Search Report issued Oct. 14, 2011 in Application No. 11182760.6.

Office Action dated Mar. 9, 2011 in Chinese Patent Application No. 200810210650.3.

* cited by examiner

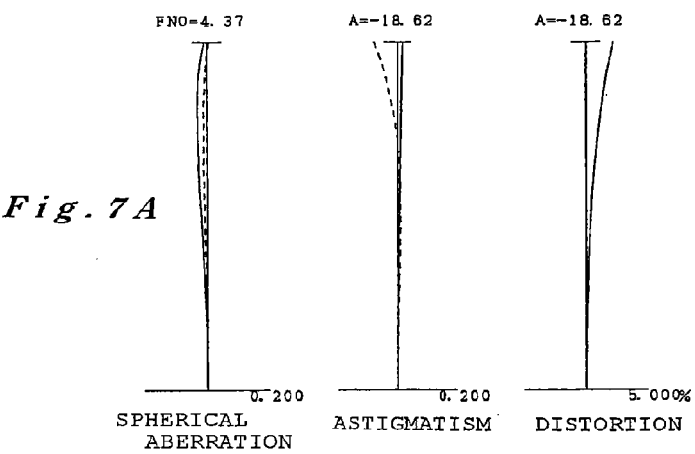
Fig. 7A
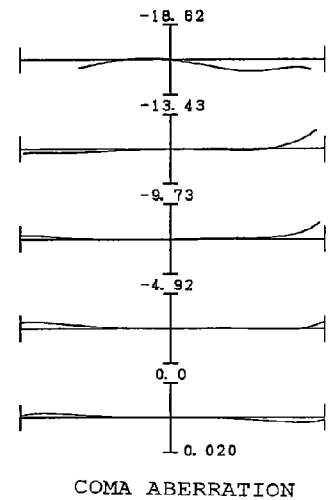
COMA ABERRATION
Fig. 7B
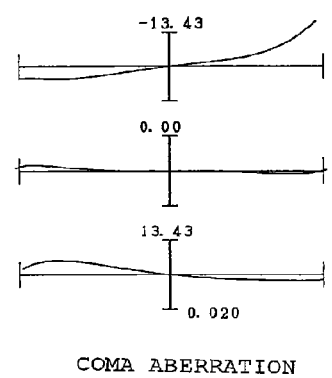
COMA ABERRATION

SPHERICAL ABERRATION  ASTIGMATISM  DISTORTION

COMA ABERRATION

COMA ABERRATION

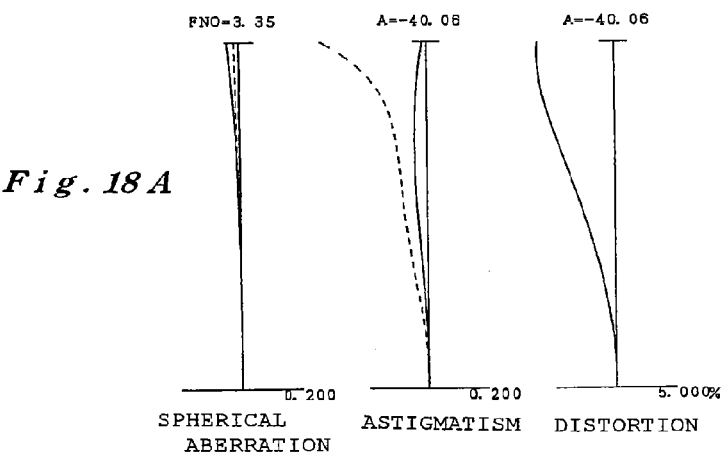
*Fig. 18A*
SPHERICAL ABERRATION    ASTIGMATISM    DISTORTION
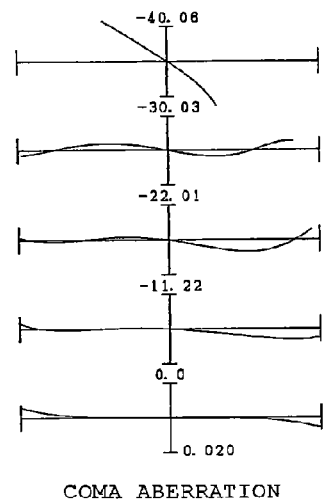
COMA ABERRATION
*Fig. 18B*
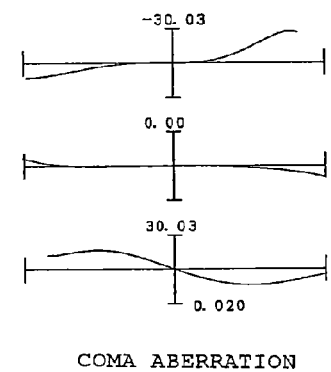
COMA ABERRATION

ZOOM LENS, OPTICAL APPARATUS, AND METHOD FOR FORMING AN IMAGE OF AN OBJECT

INCORPORATION BY REFERENCE

This application is a division of application Ser. No. 12/044,914 filed Mar. 7, 2008. Also, this invention claims the benefit of Japanese Patent Application No. 2007-061055 and No. 2007-099530 which is hereby incorporated by reference.

FILE OF THE INVENTION

The present invention relates to a zoom lens that is used in an optical apparatus such as a digital still camera.

BACKGROUND OF THE INVENTION

Optical apparatuses such as digital still cameras and video cameras generally have a zoom lens mounted therein and a multiplicity of suitable zoom lenses have been proposed. Nowadays, portability has become extremely important for optical apparatuses such as digital still cameras and steps toward miniaturizing zoom lenses which are photographic lenses and making zoom lenses lightweight have been taken in order to miniaturize the camera main body and render same thin and lightweight. Among such zoom lenses, a zoom lens in which a portion of the lens system comprises an optical element that is capable of bending the path of light through approximately 90 degrees has been proposed. By installing a zoom lens of this kind, where the transition is made from a housed state to a usage state, there is no protrusion from the camera main body, which affords superior portability in the usage state and also makes a large contribution toward creating a thinner and more miniature camera.

However, a large number of zoom lenses that comprise an optical element that makes it possible to bend the path of light through approximately 90 degrees excel with respect to miniaturization and the production of a thinner camera and, therefore, the focal length in the wide-angle end state is large and an enlargement of the field of view is ignored. Hence, users have been able to photograph over a wider range and obtain results of a perspective that is closer to the object. Conventional zoom lenses that are capable of bending the path of light include a five-group type zoom lens comprising, in order from the object, a first lens group which has positive refractive power, a second lens group which has negative refractive power, a third lens group which has positive refractive power, a fourth lens group which has positive refractive power, and a fifth lens group which has negative refractive power. (See Japanese Application Laid Open No. 2005-84283, for example).

In addition, while a camera of this kind is more miniature, thinner, and more lightweight, it is, on the other hand, difficult to hold such a camera in the usage state and there has been the risk of considerable photographic failure due to camera shake and so forth. More specifically, there has been the risk of degradation of the image quality due to image shaking during exposure as a result of the minute amount of camera shake that occurs during photography (camera shake that occurs where the photographer pushes the release button). Therefore, a method of correcting image shake by driving a shift lens group to compensate for image shake that occurs in such camera shake by combining, as an optical system which is capable of image-shifting the zoom lens, a detection system for detecting camera shake, a calculation system that controls the shift lens group in accordance with a value output by the detection system, and a drive system that shifts the shift lens group, is known.

As a zoom lens that is capable of image-shifting, Japanese Application Laid Open No. 2000-298235, for example, is known. Japanese Application Laid Open No. 2000-298235 discloses a zoom lens which comprises a first lens group which has positive refractive power, a second lens group which has negative refractive power, a third lens group which has positive refractive power, a fourth lens group which has negative refractive power, and a fifth lens group which has positive refractive power, wherein the whole of the third lens group is moved in a direction which is substantially vertical to the optical axis to correct shaking of the photographic image where the variable power optical system vibrates.

Problems to be Solved by the Invention

Further, there is also an increased demand for a wide-angled zoom lens for which the field of view at the wide-angle end exceeds about 75 degrees in increasing the photographer's potential for implementing photography. Because such a wide field of view can be used, photography with a higher degree of freedom can be enjoyed. However, it is extremely difficult to achieve a higher picture quality while also making the zoom lens more miniature and thinner and affording same a wider field of view and, even where both these tasks have been achieved, optical systems have grown in size.

SUMMARY OF THE INVENTION

The present invention was conceived in view of these problems and an object thereof is to provide a zoom lens that is capable of obtaining a high image formation performance with a small-scale design and a wide field of view, an optical apparatus, and a method for forming an image of an object.

In addition, in order to adapt to user needs which demand a reduced drop in image quality caused by camera shake or the like and more stable image recording, conventional optical systems have employed a faster shutter speed by using a brighter lens system. However, where a brighter lens system is to be employed, the lens system is easily enlarged in order to increase the aperture and, where the aperture is increased, this is contrary to the interests of making a miniature and lightweight camera.

The present invention was conceived in view of these problems and a second object thereof is to provide a zoom lens which is capable of obtain a high image formation performance with a small-scale design, an optical apparatus, and a method for forming an image of an object.

Means to Solve the Problems

In order to solve such problems, the zoom lens according to the present invention comprises a zoom lens having a plurality of lens groups which are disposed in order from an object, wherein a first lens group that is disposed to closest to the object among the plurality of lens groups has positive refractive power and comprises a light path bending element which bends the path of light and a plurality of lens components which are disposed closer to the object than the light path bending element; and, where the distance on an optical axis from the surface closest to the object in the first lens group to the surface closest to the object in the light path bending element is L1 and the distance on the optical axis of the light path bending element is Lp, the following conditional expression is satisfied:

$$L1/Lp<1.0.$$

In the above zoom lens, the plurality of lens components is preferably two lenses.

In the above zoom lens, the plurality of lens components is preferably all negative lenses.

In the above zoom lens, the conditional expression ndp>1.80 is preferably satisfied, where the light path bending element is a prism and the refractive index of d-line of the prism is ndp.

In the above zoom lens, the plurality of lens groups preferably comprises four sets of lens groups.

In the above zoom lens, the field of view in the wide-angle end state is preferably equal to or more than 75 degrees.

The zoom lens according to the second invention has a plurality of lens groups which are disposed in order from an object, wherein a first lens group that is disposed to closest to the object among the plurality of lens groups has positive refractive power and comprises a light path bending element which bends the path of light and a plurality of lens components which are disposed closer to the object than the light path bending element; and at least a portion of the lens group which is disposed to closer to the image than the first lens group is able to move substantially at right angles to the optical axis as a shift lens group.

In the above zoom lens, the following conditional expression $0.75<\beta bw\times(1-\beta aw)/(Ymax/fw)<1.2$ is preferably satisfied, where the used lateral magnification of the shift lens group in the wide-angle end state is βaw, the used lateral magnification of lenses which are disposed between the shift lens group and the imaging surface in the wide-angle end state is βbw, the focal length of the zoom lens in the wide-angle end state is fw, and the maximum image height is Ymax.

In the above zoom lens, the shift lens group is preferably fixed during zooming from the wide-angle end state to the telephoto end state.

In the above zoom lens, the shift lens group preferably has a plurality of lens components.

In the above zoom lens, the plurality of lens groups preferably comprises, in order from the object, the first lens group, a second lens group having negative refractive power, a third lens group having positive refractive power, and a fourth lens group having positive refractive power.

In the above zoom lens, the first lens group and the third lens group are fixed during zooming from the wide-angle end state to the telephoto end state, and the second lens group and the fourth lens group move along the optical axis during zooming from the wide-angle end state to the telephoto end state.

In the above zoom lens, among the plurality of lens groups, an aperture stop is preferably provided next to the image of the lens component closest to the object in the lens group which comprises the shift lens group.

In the above zoom lens, among the plurality of lens groups, an aperture stop is preferably provided next to the object of the lens component closest to the object in the lens group which comprises the shift lens group.

In the above zoom lens, the following conditional expression $0.2<fw/fs<0.5$ is preferably satisfied, where a focal length of the zoom lens in the wide-angle end state is fw and a focal length of the whole lens group which comprises the shift lens group among the plurality of lens groups is fs.

An optical apparatus according to the present invention is equipped with the above zoom lens.

An image formation method according to the present invention that uses a zoom lens which has a plurality of lens groups which are disposed in order from the object to form an image of an object on a predetermined surface, wherein a first lens group which is disposed to closest to the object among the plurality of lens groups is afforded positive refractive power, the first lens group is provided with a light path bending element which bends the path of light and a plurality of lens components are disposed closer to the object than the light path bending element, and the following conditional expression L1/Lp<1.0 is satisfied, where the distance on the optical axis from the surface closest to the object in the first lens group to the surface closest to the object in the light path bending element is L1 and the distance on the optical axis of the light path bending element is Lp.

In the above method, the plurality of lens components preferably comprises two lenses.

In the above method, the plurality of lens components are preferably all negative lenses.

In the above method, the following conditional expression ndp>1.80 is preferably satisfied, where the light path bending element is a prism and the refractive index of d-line of the prism is ndp.

An image formation method according to the present invention that uses a zoom lens which has a plurality of lens groups which are disposed in order from the object to form an image of an object on a predetermined surface, wherein a first lens group which is disposed to closest to the object among the plurality of lens groups is afforded positive refractive power, the first lens group is provided with a light path bending element which bends the path of light and a plurality of lens components are disposed closer to the object than the light path bending element; and at least a portion of the lens group which is disposed to closer to the image than the first lens group is able to move substantially at right angles to the optical axis as a shift lens group.

In the above method, the following conditional expression $0.75<\beta bw\times(1-\beta aw)/(Ymax/fw)<1.2$ is preferably satisfied, where the used lateral magnification of the shift lens group in the wide-angle end state is βaw, the used lateral magnification of lenses which are disposed between the shift lens group and the imaging surface in the wide-angle end state is βbw, a focal length of the zoom lens in the wide-angle end state is fw, and the maximum image height is Ymax.

In the above method, the shift lens group is preferably fixed during zooming from the wide-angle end state to the telephoto end state.

In the above method, the plurality of lens groups preferably comprises, in order from the object, the first lens group, the second lens group, the third lens group, and the fourth lens group, wherein the first lens group and the third lens group are fixed during zooming from the wide-angle end state to the telephoto end state, and the second lens group and the fourth lens group move along the optical axis during zooming from the wide-angle end state to the telephoto end state.

In the above method, the following conditional expression $0.2<fw/fs<0.5$ is preferably satisfied, where a focal length of the zoom lens in the wide-angle end state is fw and the focal length of the whole lens group which comprises the shift lens group among the plurality of lens groups is fs.

Advantageous Effects of the Invention

The present invention is capable to obtaining a high image formation performance with a small scale design and wide field of view.

Further scope of applicability of the present invention will become apparent from the detailed description given hereinafter. However, it should be understood that the detailed description and specific examples, while indicating preferred examples of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 7A is a graph showing various aberrations of the zoom lens according to Example 1 upon focusing on infinity in the intermediate focal length state;

FIG. 7B is a lateral aberration graph during lens shifting in the intermediate focal length state according to Example 1;

FIG. 18A is a graph showing various aberrations of the zoom lens according to Example 4 upon focusing on infinity in the wide-angle end state;

FIG. 18B is a lateral aberration graph during lens shifting in the wide-angle end state according to Example 4;

DESCRIPTION OF THE PREFERRED EMBODIMENTS

First Embodiment

Figure 1:
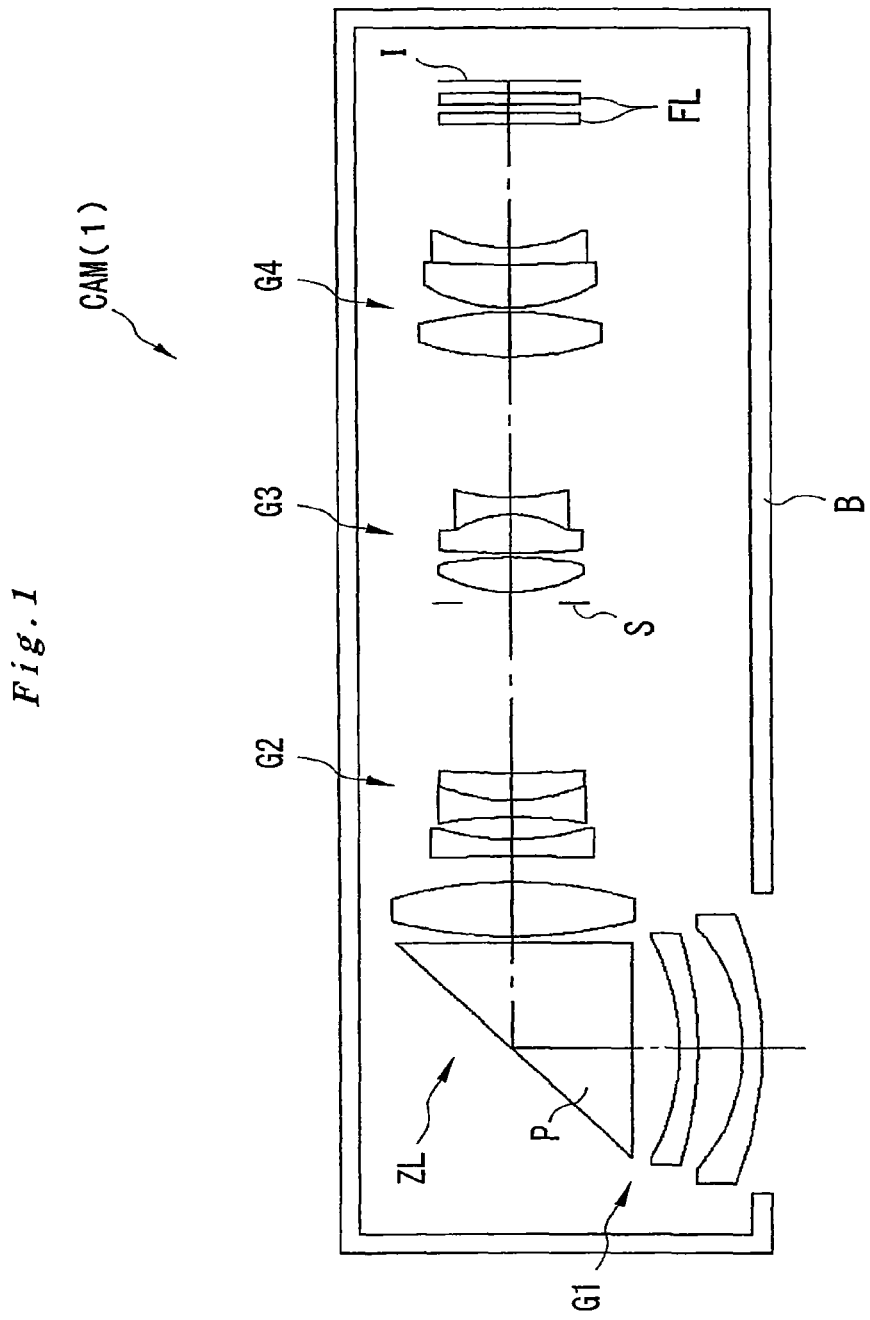
FIG. 1 is a schematic constitutional view of a digital still camera according to Example 1.

The preferred first embodiment of this application will be described hereinbelow with reference to the drawings. The digital still camera CAM (1) that comprises the zoom lens ZL according to the present invention is shown in FIG. 1. The digital still camera CAM (1) comprises a zoom lens ZL that forms an image of the photographic object (object) on the imaging surface I and an image pickup apparatus (not shown) that is disposed on the imaging surface I, which are contained in the camera main body B. A filter group FL that comprises a lowpass filter and an infrared cut filter or the like is disposed between the zoom lens ZL and the imaging surface I.

The zoom lens ZL comprises, in order from the object, a first lens group G1 which has positive refractive power and comprises a light path bending element P, a second lens group G2 which has negative refractive power, a third lens group G3 which has positive refractive power, and a fourth lens group G4 which has positive refractive power. Furthermore, during zooming from the wide-angle end to the telephoto end, the second lens group G2 and the fourth lens group G4 move along the optical axis and the first lens group G1 and the third lens group G3 are fixed to the imaging surface I.

The first lens group G1 acts to bend the path of light through 90 degrees and acts to converge the light beam. During zooming from the wide-angle end to the telephoto end, because the first lens group G1 is always fixed, same is the largest among the respective lens groups and there is no need to render a heavy lens group mobile, which permits structural simplification.

The second lens group G2 acts to enlarge the image of the photographic object (object) formed by the first lens group G1 and raises the rate of magnification by increasing the distance between the first lens group G1 and the second lens group G2 in moving from the wide-angle end state to the telephoto end state, whereby the focal length is changed.

The third lens group G3 acts to converge the light beam that has been enlarged by the second lens group G2 and, for the sake of achieving a higher performance, the third lens group G3 comprises a plurality of lens components and a state where spherical aberrations and sine conditions and Petzval sum is favorably corrected is desirable.

The fourth lens group G4 acts to further converge the light beam that has been converged by the third lens group G3 and, by actively changing the distance between the third lens group G3 and the fourth lens group G4 where changing the focal length (where zooming), fluctuations in the imaging surface with respect to changes in the focal length can be suppressed.

In a zoom lens ZL which comprises a plurality of such lens groups, the first lens group G1, which is disposed to closest to the object among the plurality of lens groups, has positive refractive power, comprises the light path bending element P which bends the path of light, and, in order to achieve a wider field of view and higher performance, a plurality of lens components are preferably disposed closer to the object than the light path bending element P. As a result, the first lens group G1 closest to the object is afforded positive refractive power and, by disposing a plurality of lens components closer to the object than the light path bending element P, structural simplification is possible and coma aberration which occurs in the first lens group G1 alone can be favorably corrected using a minimum number of constituent elements.

Furthermore, where the distance along the optical axis from the surface closest to the object of the first lens group G1 to the surface closest to the object of the light path bending element P is L1 and the distance along the optical axis of the light path bending element P is Lp, the condition represented by the next conditional expression (1) is preferably satisfied.

$$L1/Lp<1.0 \qquad (1)$$

By satisfying the condition of conditional expression (1), the whole lens length can be shortened even where a plurality of lens components is disposed closer to the object than the light path bending element P and the zoom lens ZL can be made thinner and miniaturized. Thus, a zoom lens ZL which has a high image formation performance with a small-scale design and a wide field of view and an optical apparatus (digital still camera CAM(1)) which comprises the zoom lens ZL can be obtained.

Conditional expression (1) is a conditional expression that prescribes a suitable range for the distance along the optical axis from the surface closest to the object of the first lens group G1 to the surface closest to the object of the light path bending element P and the distance along the optical axis of the light path bending element P. In cases where the condition of the conditional expression (1) is not satisfied, the total lens length on the side closer to the object than the light path bending element P is long and the thickness of the optical system increases. As a result, the thickness of the camera main body B is effected and the zoom lens is not miniaturized or made thinner. The upper limit of conditional expression (1) is preferably made 0.9, more preferably 0.85, and even more preferably 0.65.

In addition, the plurality of lens components closer to the object than the light path bending element P is preferably two lenses. Thus, a miniature, high-performance lens can be obtained.

Moreover, in order to establish an additional balance between a wider field of view and miniaturization, the plurality of lens components closer to the object than the light path bending element P has a negative power overall and are preferably all negative lens. Thus, structural simplification is possible, a wider field of view can be achieved using a minimum number of constituent parts, and coma aberration that occurs in the first lens group G1 alone can be favorably corrected.

In addition, where the light path bending element P is a prism and the refractive index of d-line of the light path bending element P (prism) is ndp, the condition represented by conditional expression (2) below is preferably satisfied.

$$ndp>1.80 \qquad (2)$$

Conditional expression (2) is a conditional expression that prescribes a suitable refractive index range for the light path bending element P (prism). In cases where the condition of conditional expression (2) is not satisfied, the size of the light path bending element P (prism) increases and the zoom lens ZL increases in overall size, which is disadvantageous. As a result, the thickness of the camera main body B is affected and miniaturization is not achieved. In addition, curvature of the imaging surface and chromatic aberration which arise in the light path bending element P (prism) alone increase and favorable correction is difficult. The lower limit value of the conditional expression (2) is preferably 1.82, more preferably 1.83, and more preferably 1.88.

In addition, as mentioned earlier, a plurality of lens groups preferably comprises four lens groups. Thus, the zoom lens ZL can be suitably miniaturized.

Furthermore, as mentioned earlier, the plurality of lens groups preferably comprises, in order from the object, the first lens group G1, the second lens group G2 which has negative refractive power, the third lens group G3 which has positive refractive power, and the fourth lens group which has positive refractive power. Thus, the zoom lens ZL can be more suitably miniaturized.

In addition, the field of view at the wide-angle end is preferably equal to or more than 75 degrees and a particularly effective result can be obtained with a zoom lens which has such a wide field of view.

Furthermore, in this application, in order to prevent failure of photography caused by image shake due to hand shake which arises with a high variable power zoom lens, a shake detection system that detects shake in the lens system and driving means are combined in the lens system and all or some of any one lens group among the lens groups that constitute the lens system may be decentered as a shift lens group. By shifting the image by driving a shift lens group by means of the driving means to correct image shake (a change in the position of the imaging surface) that arises from shake of the lens system that is detected by means of the shake detection system, image shake can be corrected. Thus, the zoom lens ZL of this application can be made to function as a so-called vibration-proof optical system.

Second Embodiment

Figure 2A:
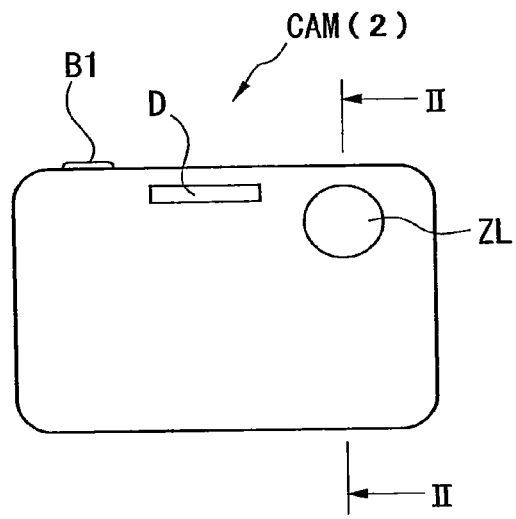
FIG. 2A is a front view of a digital still camera according to Example 2.
Figure 2B:
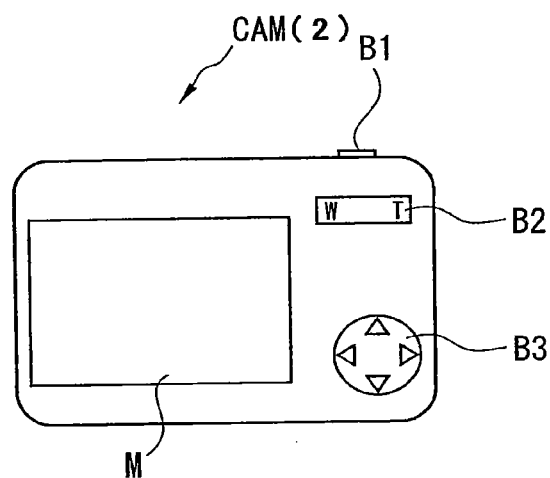
FIG. 2B is a background view of a digital still camera.
Figure 3:
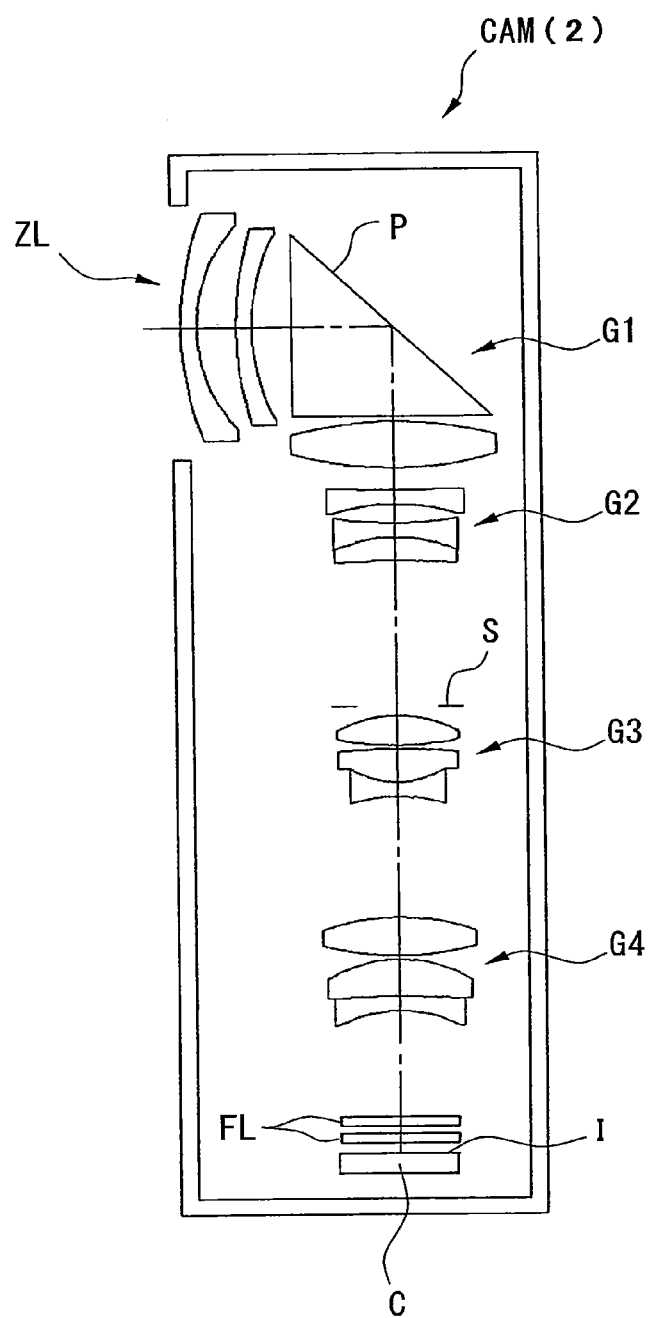
FIG. 3 is a cross-sectional view along arrow II-II in FIG. 2A.

The preferred second embodiment of this application will be described next with reference to the drawings. A digital still camera CAM (2) that comprises the zoom lens ZL according to this application is shown in FIGS. 2A and 2B. FIG. 2A shows a front view of the digital still camera and FIG. 2B shows a rear view thereof. FIG. 3 is a cross-sectional view along arrow II-II in FIG. 2A and provides an overview of the zoom lens ZL (described subsequently).

When the power button (not shown) of the digital still camera CAM (2) shown in FIGS. 2 and 3 is pushed, the shutter (not illustrated) of the photographic lens (ZL) is opened such that the light from the photographic object (object) is condensed by the photographic lens (ZL) and an image is formed on an image pickup apparatus C disposed on the imaging surface I. The image of the photographic object formed on the image pickup apparatus C is displayed on a liquid crystal monitor M which is disposed behind the digital still camera CAM (2). The photographer determines a view of the photographic object while viewing the liquid crystal monitor M and then pushes the release button B1 to photograph the photographic object by means of the image pickup apparatus C and saves this image by recording same to memory (not illustrated).

The photographic lens comprises the zoom lens ZL according to this application and the path of the light that enters from the front side of the digital still camera CAM (2) is bent downward through approximately 90 degrees by the light path bending element P in the zoom lens ZL (downward on the page of FIG. 3). The digital still camera CAM (2) can therefore be made thinner. Furthermore, disposed in the digital still camera CAM (2) are an auxiliary light-emitting portion D that emits auxiliary light in cases where the photographic object is dark, a wide (W)/telephoto button B2 where zooming the zoom lens ZL from a wide-angle end state (W) to a telephoto end state (T) and a function button B3 that is used where setting various conditions for the digital still camera CAM (2).

The zoom lens ZL comprises, in order from the object, a first lens group G1 which has positive refractive power and comprises the light path bending element P, a second lens group G2 which has negative refractive power, a third lens group G3 which has positive refractive power, and a fourth lens group G4 which has positive refractive power. The zoom lens ZL is constituted to be able to perform an image shift on the imaging surface by moving all or part of the third lens group G3 approximately at right angles to the optical axis as a shift lens group.

In addition, during zooming from the wide-angle end to the telephoto end, the first lens group G1 and the third lens group G3 are fixed to the imaging surface I and, as a result of the second lens group G2 and the fourth lens group G4 moving along the optical axis, the distance between the first lens group G1 and the second lens group G2 increases, the distance between the second lens group G2 and the third lens group G3 decreases, and the distance between the third lens group G3 and the fourth lens group G4 decreases. Further, the filter group FL constituted by a lowpass filter and infrared cut filter or the like is disposed between the zoom lens ZL and imaging surface I.

The first lens group G1 acts to bend the path of light through approximately 90 degrees and acts to converge the light beam. During zooming from the wide-angle end to the telephoto end, because the first lens group G1 is always fixed, same is the largest among the respective lens groups and there is no need to render a heavy lens group mobile, which permits structural simplification.

Furthermore, the first lens group G1, which is disposed to closest to the object among the plurality of lens groups, has positive refractive power and comprises the light path bending element P which bends the path of light. In order to achieve a wider field of view, a plurality of lens components are preferably disposed closer to the object than the light path bending element P. For example, the zoom lens ZL desirably comprises a first negative meniscus lens having a convex surface facing the object, a second negative meniscus lens having a convex surface facing the object, the light path bending element P, and a positive lens having a convex surface facing the object. Thus, structural simplification is possible and spherical aberration and coma aberration which occur in the first lens group G1 alone can be favorably corrected by means of the minimum number of constituent parts.

The second lens group G2 acts to enlarge the image of the photographic object (object) formed by the first lens group G1 and raises the rate of magnification by increasing the distance between the first lens group G1 and the second lens group G2 in moving from the wide-angle end state to the telephoto end state, whereby the focal length is changed.

The third lens group G3 acts to converge the light beam that has been enlarged by the second lens group G2 and, for the sake of achieving a higher performance, the third lens group G3 desirably comprises a plurality of lens components. Further, the third lens group G3 needs to be put in a state where spherical aberrations, sine conditions and the Petzval sum are favorably corrected so that the image is favorable during lens shifting.

The correction of the spherical aberration and sine condition serves to suppress eccentric coma aberration that occurs in the center of the screen where the shift lens group is moved substantially at right angles to the optical axis. In addition, the correction of the Petzval sum serves to suppress curvature of the imaging surface that occurs in the circumferential portion of the screen when the shift lens group is moved substantially at right angles to the optical axis. During lens shifting, an image shift is executed by moving all or part of the third lens group G3 substantially at right angles to the optical axis (as a shift lens group) and image shake on the imaging surface when hand shake occurs is corrected.

The fourth lens group G4 acts to converge the light beam that has been converged by the third lens group G3 and, by actively changing the distance between the third lens group G3 and the fourth lens group G4 where the focal length is changed (during zooming), a change in the imaging surface with respect to a change in the focal length can be suppressed.

In zoom lens ZL which comprises a plurality of such lens groups, at least a portion of the lens group that is disposed to closer to the image than the first lens group G1 can preferably be moved substantially at right angles to the optical axis as a shift lens group. Thus, a zoom lens ZL which is capable of image shifting and has high image formation performance with a small design (that is, which has a vibration-proof function) and an optical apparatus that comprises the zoom lens ZL (digital still camera CAM (2)) can be obtained. Because the first lens group G1 is not a shift lens group, the largest first lens group G1 can be fixed and the complexity of a vibration-proof lens driving mechanism can be avoided.

Here, where the used lateral magnification of the third lens group G3 (shift lens group) in the wide-angle end state is βaw, the used lateral magnification of lenses which are disposed between the third lens group G3 and the imaging surface in the wide-angle end state is βbw, the focal length of the zoom lens in the wide-angle end state is fw, and the maximum image height is Ymax, the conditions represented by the following conditional expression (3) is preferably satisfied.

$$0.75 < \beta bw \times (1-\beta aw)/(Ymax/fw) < 1.2 \qquad (3)$$

The numerator of conditional expression (3) is called the so-called vibration reduction coefficient and, therefore, a suitable range is prescribed for the movement amount at right angles from the optical axis of the image on the imaging surface with respect to the movement amount substantially at right angles from the optical axis of the third lens group G3 in the wide-angle end state. Here, where the vibration reduction coefficient is explained, generally speaking, in cases where the image on the imaging surface is shifted by moving the shift lens group substantially at right angles to the optical axis, the image shift amount Δ with respect to the movement amount δ of the shift lens group is represented by the following expression (A).

$$\Delta = \delta \times (1-\beta a) \times \beta b \qquad (A)$$

When expression (A) is modified, the following expression (B) is obtained.

$$\Delta/\delta = (1-\beta a) \times \beta b \qquad (B)$$

where βa is the lateral magnification of the shift lens group and βb is the lateral magnification with respect to the lens group disposed closer to the image than the shift lens group. Further, $(1-\beta a) \times \beta b$ on the right side of Expression (B) is called the vibration reduction coefficient.

In cases where there is a condition to raise the upper limit value of conditional expression (3), because the movement amount of the image with respect to the movement amount from the optical axis of the third lens group G3 is excessively large, the third lens group G3 moves only a minute amount, and the image moves by a large amount, it is difficult to control the position of the shift lens group and it is no longer possible to obtain a sufficient level of accuracy. In addition, coma aberration and imaging surface curvature worsen, which is disadvantageous. On the other hand, in cases where there is a condition to lower the lower limit value of conditional expression (3), the movement amount of the image with respect to the movement amount from the optical axis of the third lens group G3 is relatively small and the movement amount of the shift lens group that is required in order to cancel image shake due to hand shake or the like is extremely large. As a result, the driving mechanism to move the shift lens group (third lens group G3) is enlarged and miniaturization of the lens diameter can no longer be miniaturized. Furthermore, coma aberration worsens, which is disadvantageous.

In order to make the results of this embodiment reliable, the upper limit value of conditional expression (3) is more preferably 1.15. In addition, in order to make the results of this embodiment reliable, the upper limit value of conditional expression (3) is more preferably 1.1. Further, in order to render the results of this embodiment reliable, the lower limit value of conditional expression (3) is more preferably 0.77. Additionally, in order to afford the results of this embodiment greater reliability, the lower limit value of conditional expression (3) is preferably made 0.80.

Furthermore, the third lens group G3, which is the shift lens group, is preferably fixed during zooming from the wide-angle end state to the telephoto end state. Thus, complexity of the drive mechanism that moves the shift lens group (third lens group G3) can be avoided.

Further, in the invention above, the third lens group G3, which is a shift lens group, preferably comprises a plurality of lens components. Thus, the efficiency of a vibration-proof function can be improved.

Moreover, the field of view in the wide-angle end state is preferably equal to or more than 75 degrees and preferably equal to or more than 80 degrees. Thus, the field of view can be afforded a wide range and the photographic freedom can be improved.

In addition, as mentioned earlier, the plurality of lens groups which constitute the zoom lens ZL preferably comprises, in order from the object, the first lens group G1, the second lens group G2, the third lens group G3, and the fourth lens group G4. Thus, the zoom lens ZL can be suitably miniaturized.

Here, the second lens group G2 preferably has negative refractive power, the third lens group G3 preferably has positive refractive power, and the fourth lens group G4 preferably has positive refractive power. Thus, the desired optical performance can be obtained by means of the minimum constitution.

Here, the first lens group G1 and the third lens group G3 are preferably fixed during zooming from the wide-angle end state to the telephoto end state and the second lens group G2 and the fourth lens group G4 preferably move along the optical axis during zooming from the wide-angle end state to the telephoto end state. Thus, changes in the aberrations caused by zooming can be minimized.

In addition, in order to balance the performance degradation during lens shifting with an ever higher performance, an aperture stop is preferably provided next to the image of the lens component closest to the object of the third lens group G3 (lens group comprising the shift lens group). By performing a lens shift at a point close to the stop through which an off-axis light beam passes close to the optical axis during zooming in order to keep the performance degradation during lens shifting to a minimum, the image shift-capable lens group is able to retain a favorable image formation performance.

An aperture stop may also be provided next to the object of the lens component closest to the object of the third lens group G3. Thus, the same results as in the case above can be obtained.

In addition, where the focal length of the zoom lens in the wide-angle end state is fw and the focal length of the third lens group G3 (the whole lens group comprising the shift lens group) is fs, the condition represented by the conditional expression (4) below is preferably satisfied.

$$0.2 < fw/fs < 0.5 \qquad (4)$$

Conditional expression (4) is a conditional expression for prescribing the focal length of the third lens group G3. In cases where there is a condition to raise the upper limit value of conditional expression (4), the refractive power of the third lens group G3 is strong and the spherical aberration that occurs in the third lens group G3 alone is large. On the other hand, in cases where there is a condition to lower the lower limit value of conditional expression (4), the refractive power of the third lens group G3 is weak and, because the third lens group G3 is then no longer afocal, the change in the curvature of the imaging surface is large where a lens shift is made.

In order to make the results of this embodiment reliable, the upper limit value of conditional expression (4) is preferably 0.45. In addition, in order to make the results of this embodiment reliable, the upper limit value of conditional expression (4) is more preferably 0.4. In addition, in order to render the results of this embodiment reliable, the lower limit value of conditional expression (4) is more preferably 0.23. In addition, in order to afford the results of this embodiment greater reliability, the lower limit value of conditional expression (4) is more preferably 0.26.

In addition, in this embodiment, the third lens group G3 preferably comprises a single lens with positive refractive power and a composite lens with negative refractive power in order to favorably correct the spherical aberration that occurs in the third lens group G3 alone and make the emission pupil position as far as possible from the imaging surface. More specifically, the third lens group G3 desirably comprises, in order from the object, a positive lens having a convex surface facing the object and a composite lens which has negative refractive power made by sticking together a positive lens having a convex surface facing the object and a negative lens having a concave surface facing the image. Thus, as a result of an off-axis light beam being converged by means of the positive lens having a convex surface facing the object and not being separated from the optical axis, miniaturization of the lens diameter can be achieved.

EXAMPLES

Specific examples will be described hereinbelow based on the attached drawings. As mentioned earlier, the zoom lenses ZL according to the respective examples comprise, in order from the object, first lens group G1 which has positive refractive power, the second lens group G2 which has negative refractive power, the third lens group G3 which has positive refractive power, and the fourth lens group G4 which has positive refractive power. These zoom lenses ZL are constituted to be capable of moving the third lens group G3 substantially at right angles to the optical axis as a shift lens group. In addition, the filter group FL, which comprises a lowpass filter and an infrared cut filter or the like, is disposed between the fourth lens group G4 and the imaging surface I.

Figure 4:
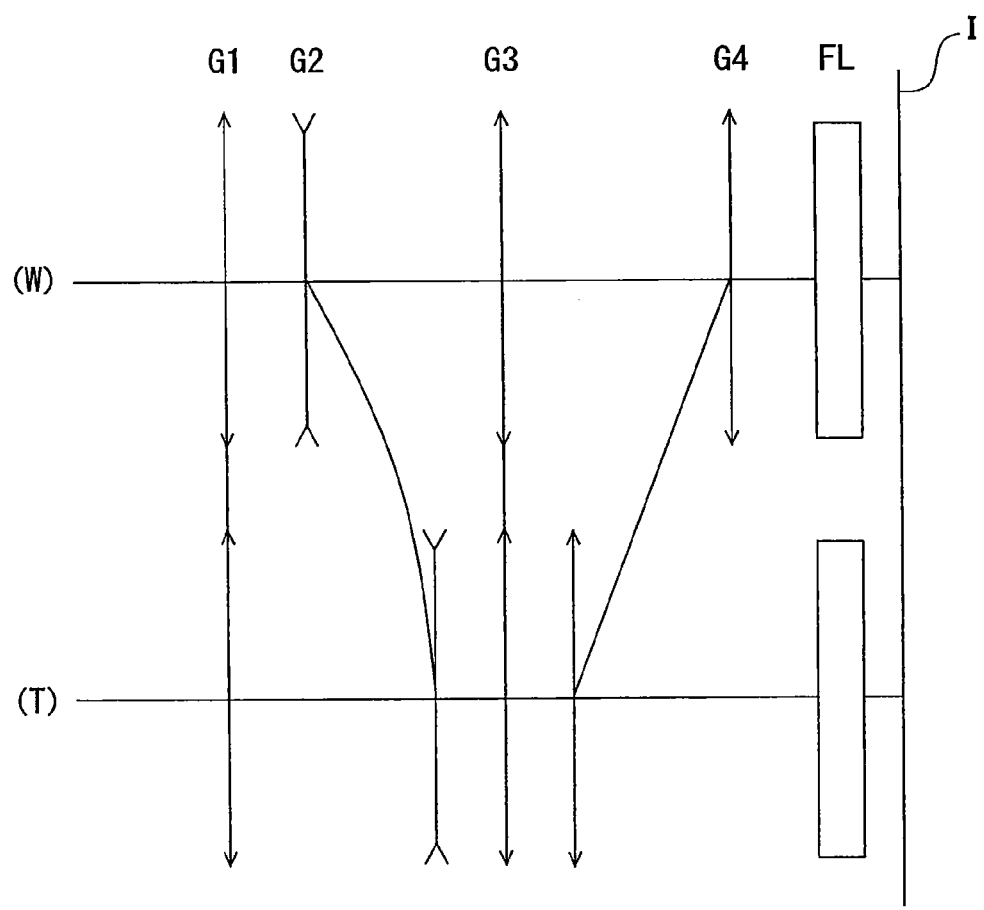
FIG. 4 is an explanatory graph showing the disposition of the refractive power of the zoom lens.

In addition, as shown in FIG. 4, during zooming from the wide-angle end to the telephoto end, the second lens group G2 and the fourth lens group G4 move along the optical axis and the first lens group G1 and the third lens group G3 are fixed to the imaging surface I. Here, the distance between the first lens group G1 and the second lens group G2 increases, the distance between the second lens group G2 and the third lens group G3 decreases, and the distance between the third lens group G3 and the fourth lens group G4 decreases. FIG. 4 shows the distribution, of the refractive power of the zoom lens according to the respective examples of the present invention and the state of the movement of the respective lens groups in the change of the focal length state (zooming) from the wide-angle end state (W) to the telephoto end state (T).

Tables 1 to 5 are shown hereinbelow, these tables being tables which hold the values of the parameters of the first to fifth examples respectively. In each table, f represents a focal length; F. NO represents an f-number; 2ω represents a field of view; and Bf represents a back focus. In addition, the surface number represents the order of the lens surfaces from the object in the direction of travel of the light rays and a refractive index and an Abbe number each indicate a value with respect to d-line (wavelength λ=587.6 nm). Here, 'mm' is generally used for the focal length f, a radius of curvature r, the surface distance and for the units of the other lengths which appear for all the parameter values hereinbelow. However, because the same optical performance is obtained even where the optical system is relatively enlarged or relatively reduced, the measurement units are not restricted to these units. The radius of curvature '0.0000' denotes a surface and '1.00000', which is the refractive index of air, is omitted.

Furthermore, an aspherical surface, which has been assigned the symbol * in each of the tables, is represented by the conditional expression (5) below where a height in a direction perpendicular to the optical axis is y, a distance (amount of sag) along the optical axis from the target surface at the apex of each aspherical surface of the height y to the respective aspherical surfaces is S(y), a radius of curvature of the reference spherical surface (paraxial radius of curvature) is r, a conical coefficient is K, and an aspherical coefficient of nth order (n=4, 6, 8, 10) is Cn. In each example, the second-order aspherical surface coefficient C2 is 0, which is omitted.

$$S(y) = (y^2/r)/\{1 + (1 - K \times y^2/r^2)^{1/2}\} + C4 \times y^4 + C6 \times y^6 + C8 \times y^8 + C10 \times y^{10} \quad (5)$$

Furthermore, in each table, the on-axis air space between the first lens group G1 and the second lens group G2 is d8; the on-axis air space between the second lens group G2 and the third lens group G3 is d13; the on-axis air space between the third lens group G3 and the fourth lens group G4 is d19; and the on-axis air space between the fourth lens group G4 and the filter group FL is d24. These on-axis air spaces (d8, d13, d19, d24) change during zooming.

Example 1

Figure 5:
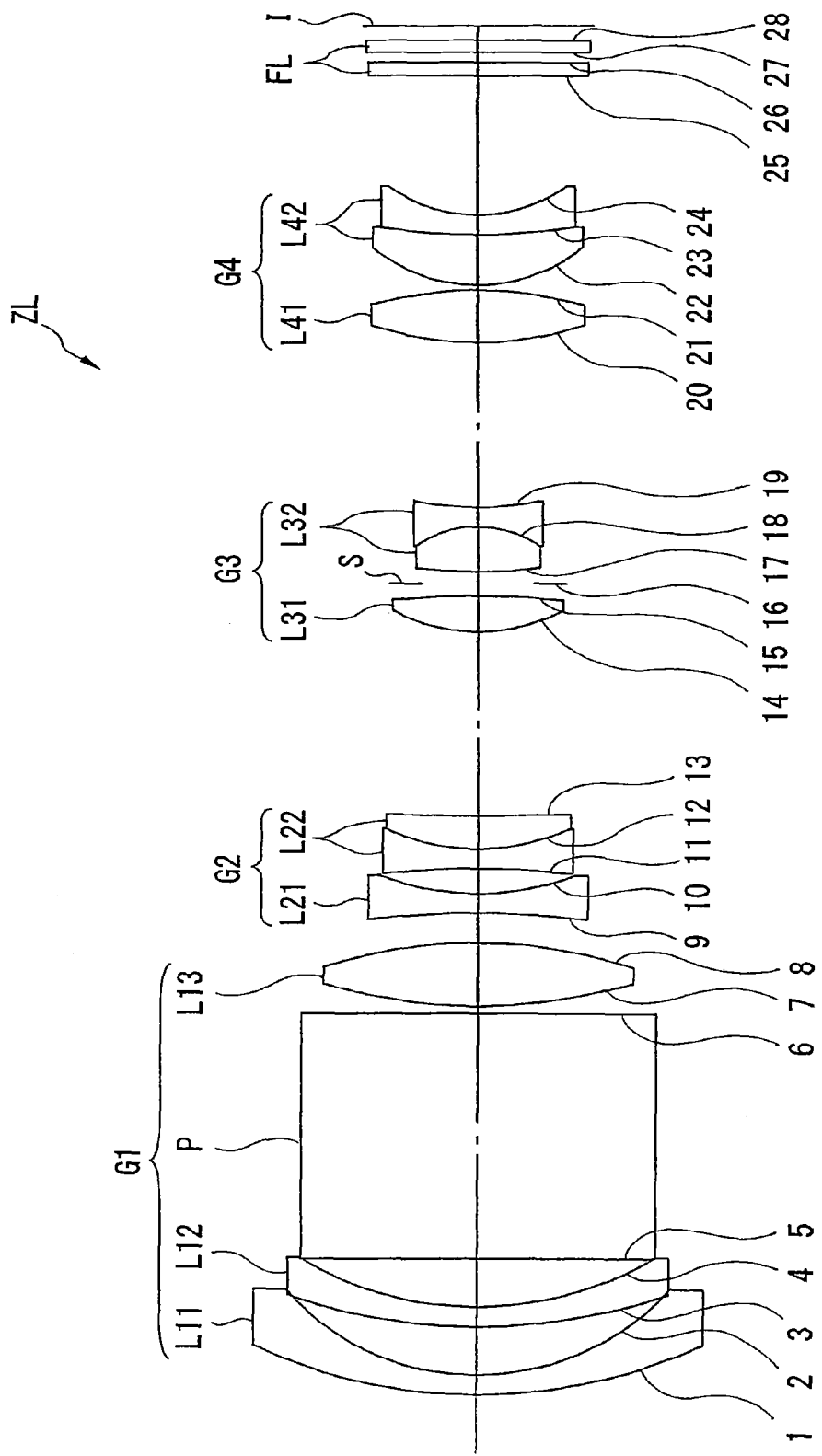
FIG. 5 is a cross-sectional view of the constitution of the zoom lens according to Example 1.

Example 1 of this application will be described hereinbelow by using FIGS. 5 to 8 and Table 1. FIG. 5 shows the constitution of the zoom lens according to Example 1. In the zoom lens ZL in FIG. 5, the first lens group G1 comprises, in order from the object, a negative meniscus lens L11 having a convex surface facing the object, a negative meniscus lens L12 having a convex surface facing the object, a light path bending element P such as a right-angled prism whose objective is to bend the path of light through approximately 90 degrees, and a two-sided convex shape positive lens L13 which has an aspherical surface on the object. The second lens group G2 comprises a two-sided concave shape negative lens L21 which has an aspherical surface on the object and a negative composite lens L22 made by sticking together a two-sided concave shape negative lens and a positive meniscus lens having a convex surface facing the object.

The third lens group G3 comprises, in order from the object, a two-sided convex shape positive lens L31 which has an aspherical surface on the object and a negative composite lens L32 made by sticking together a two-sided convex shape positive lens and a two-sided concave shape negative lens. As mentioned earlier, hand shake correction is achieved by performing an image shift on the imaging surface I where hand shake occurs by moving (shifting) the third lens group G3 substantially at right angles to the optical axis. The fourth lens group G4 comprises, in order from the object, a two-sided convex shape positive lens L41 which has an aspherical surface on the image and a negative composite lens L42 made by sticking together a positive meniscus lens having a convex surface facing the object and a negative meniscus lens having a concave surface facing the image. Further, the filter group FL is disposed between the fourth lens group G4 and the imaging surface I.

The imaging surface I is formed on an image pickup apparatus (not shown) and this image pickup apparatus comprises a CCD or CMOS or the like (as is also true for the examples hereinabove). In addition, an aperture stop S is disposed in the third lens group G3 and is fixed to the imaging surface I during zooming from the wide-angle end to the telephoto end. In FIG. 5, the light path bending element P is illustrated in an open state.

Table 1 below shows the respective parameters of Example 1. The surface numbers 1 to 28 in Table 1 correspond to surfaces 1 to 28 in FIG. 5. Further, according to Example 1, the respective lens surfaces of the seventh, tenth, fourteenth and twenty-first surfaces are formed with an aspherical shape.

TABLE 1

[All parameters]

| Wide-angle end | | intermediate focal length | | telephoto end |
|---|---|---|---|---|
| f = 4.76 | to | 10.90 | to | 16.00 |
| F.No = 3.39 | to | 4.37 | to | 5.25 |
| 2ω = 80.14 | to | 37.24 | to | 25.72 |

[Lens parameters]

| Surface number | Radius of curvature | Surface distance | Refractive index | Abbe number |
|---|---|---|---|---|
| 1 | 18.6052 | 0.80 | 1.94594 | 17.98 |
| 2 | 9.2332 | 1.95 | | |
| 3 | 20.5794 | 0.80 | 1.94594 | 17.98 |
| 4 | 12.2688 | 1.95 | | |
| 5 | 0.0000 | 10.00 | 1.88300 | 40.76 |
| 6 | 0.0000 | 0.30 | | |
| 7* | 17.1158 | 2.60 | 1.77377 | 47.17 |
| 8 | −17.3727 | (d8) | | |
| 9 | −32.1726 | 0.80 | 1.85135 | 40.10 |
| 10* | 9.3884 | 1.03 | | |
| 11 | −28.0662 | 0.80 | 1.81600 | 46.62 |
| 12 | 7.5136 | 1.37 | 1.94594 | 17.98 |
| 13 | 71.7778 | (d13) | | |
| 14* | 6.2231 | 1.47 | 1.58913 | 61.25 |
| 15 | −30.2015 | 0.50 | | |
| 16 | 0.0000 | 0.50 | | (aperture stop S) |
| 17 | 17.7088 | 1.85 | 1.65160 | 58.55 |
| 18 | −3.7876 | 0.80 | 1.83480 | 42.71 |
| 19 | 10.2556 | (d19) | | |
| 20 | 11.4173 | 2.15 | 1.60602 | 57.44 |
| 21* | −11.3941 | 0.20 | | |
| 22 | 5.7634 | 2.05 | 1.49700 | 81.54 |
| 23 | 21.6740 | 0.80 | 1.92286 | 20.88 |
| 24 | 5.2619 | (d24) | | |
| 25 | 0.0000 | 0.55 | 1.54437 | 70.51 |
| 26 | 0.0000 | 0.40 | | |
| 27 | 0.0000 | 0.50 | 1.51633 | 64.14 |
| 28 | 0.0000 | (Bf) | | |

[Aspherical surface data]

| Surface number | K | C4 | C6 | C8 | C10 |
|---|---|---|---|---|---|
| 7 | −4.3192 | $+5.7533 \times 10^{-5}$ | $-9.7251 \times 10^{-7}$ | $+5.6654 \times 10^{-9}$ | $-3.8484 \times 10^{-12}$ |
| 10 | −9.0000 | $+1.3708 \times 10^{-3}$ | $-5.0280 \times 10^{-5}$ | $+1.6668 \times 10^{-6}$ | $+7.8186 \times 10^{-9}$ |
| 14 | +0.4220 | $+1.7499 \times 10^{-4}$ | $+1.7178 \times 10^{-5}$ | $+9.9604 \times 10^{-7}$ | $-1.1530 \times 10^{-11}$ |
| 21 | +0.8800 | $+4.5013 \times 10^{-4}$ | $-8.6183 \times 10^{-7}$ | $+5.7880 \times 10^{-7}$ | $-2.6469 \times 10^{-8}$ |

[Variable distance]

| | Wide-angle end | intermediate focal length | telephoto end |
|---|---|---|---|
| f | 4.7600 | 10.8950 | 16.0000 |
| d8 | 1.2186 | 6.2361 | 7.7544 |
| d13 | 7.5858 | 2.5683 | 1.0500 |
| d19 | 6.7709 | 3.1651 | 1.1000 |
| d24 | 5.6475 | 9.2532 | 11.3183 |
| Bf | 0.5999 | 0.6000 | 0.6000 |

[Condition mapping values]

$\beta aw = 8.18708$
$\beta bw = -0.09505$
$Ymax = 3.75000$
$fw = 4.76000$
$fs(f3) = 15.95940$
$L1 = 5.50$
$Lp = 10.00$
$ndp = 1.88300$
Conditional expression (1) $L1/Lp = 0.55$
Conditional expression (2) $ndp = 1.88300$
Conditional expression (3) $\beta bw \times (1 - \beta aw)/(Ymax/fw) = 0.8671$
Conditional expression (4) $fw/fs = 0.2983$ Thus, it is clear that the above conditional expressions (1) to (4) are all satisfied by this example.

Figure 6A:
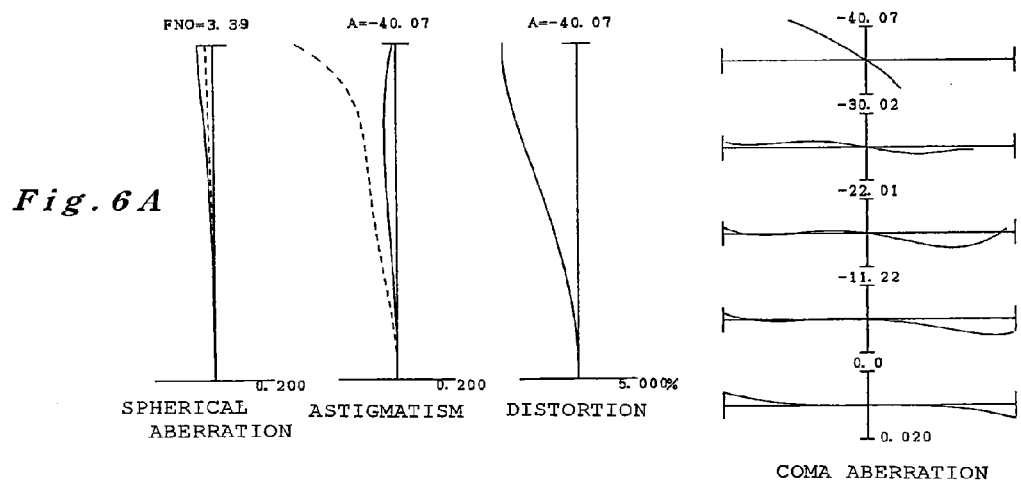
FIG. 6A is a graph showing various aberrations of the zoom lens according to Example 1 upon focusing on infinity in the wide-angle end state.
Figure 6B:
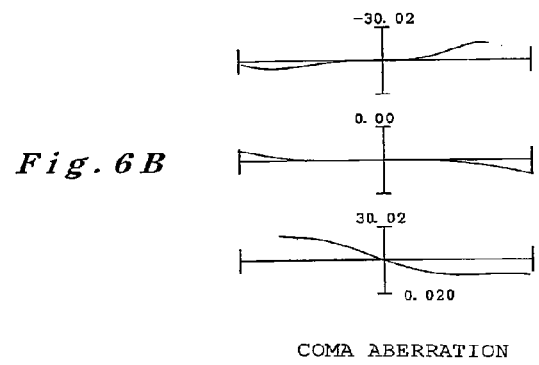
FIG. 6B is a lateral aberration graph during lens shifting in the wide-angle end state according to Example 1.
Figure 8A:
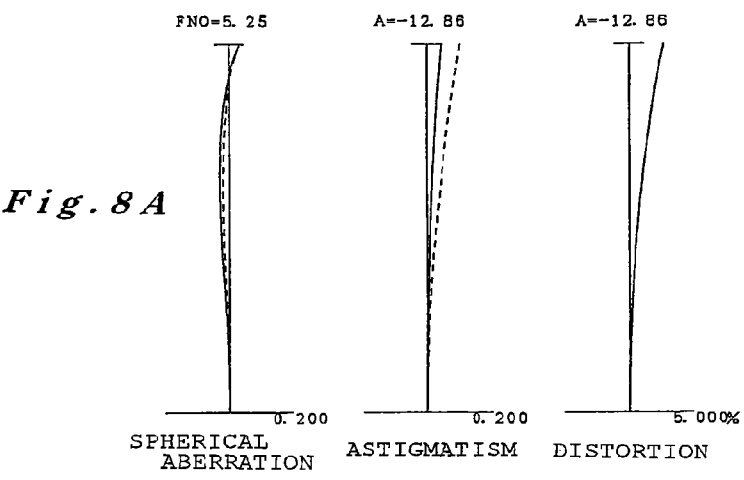
FIG. 8A is a graph showing various aberrations of the zoom lens according to Example 1 upon focusing on infinity in the telephoto end state.
Figure 8A:
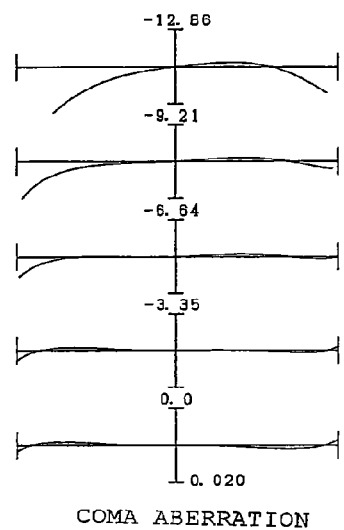
Figure 8B:
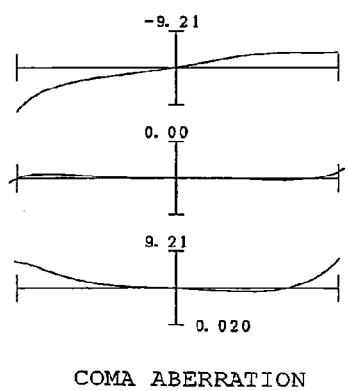
FIG. 8B is a lateral aberration graph during lens shifting in the telephoto end state according to Example 1.

FIGS. 6 to 8 are graphs showing various aberrations for Example 1 with respect to d-line (wavelength λ=587.6 nm). That is, FIG. 6A is a graph showing various aberrations of the zoom lens according to Example 1 upon focusing on infinity in the wide-angle end state (f=4.76 mm); FIG. 6B is a lateral aberration graph during lens shifting in the wide-angle end state according to Example 1; FIG. 7A is a graph showing various aberrations of the zoom lens according to Example 1 upon focusing on infinity in the intermediate focal length state (f=10.90 mm); FIG. 7B is a lateral aberration graph during lens shifting in the intermediate focal length state according to Example 1; FIG. 8A is a graph showing various aberrations of the zoom lens according to Example 1 upon focusing on infinity in the telephoto end state (f=16.00 mm); and FIG. 8B is a lateral aberration graph during lens shifting in the telephoto end state according to Example 1.

In the respective aberration graphs, the FNO represents an f-number and A represents a half angle of view for each image height. Further, in the aberration graph representing astigmatism, the solid line indicates the sagittal imaging surface and the broken line indicates the meridional imaging surface. In addition, in the aberration graph representing spherical aberration, the solid line indicates spherical aberration and the broken line indicates the sine condition. The description of the aberration graphs hereinabove is the same for the other examples. Furthermore, as is evident from the respective aberration graphs, it is clear that, according to Example 1, the various aberrations are favorably corrected in the respective focal length states from the wide-angle end state to the telephoto end state and Example 1 possesses superior image formation performance.

Example 2

Figure 9:
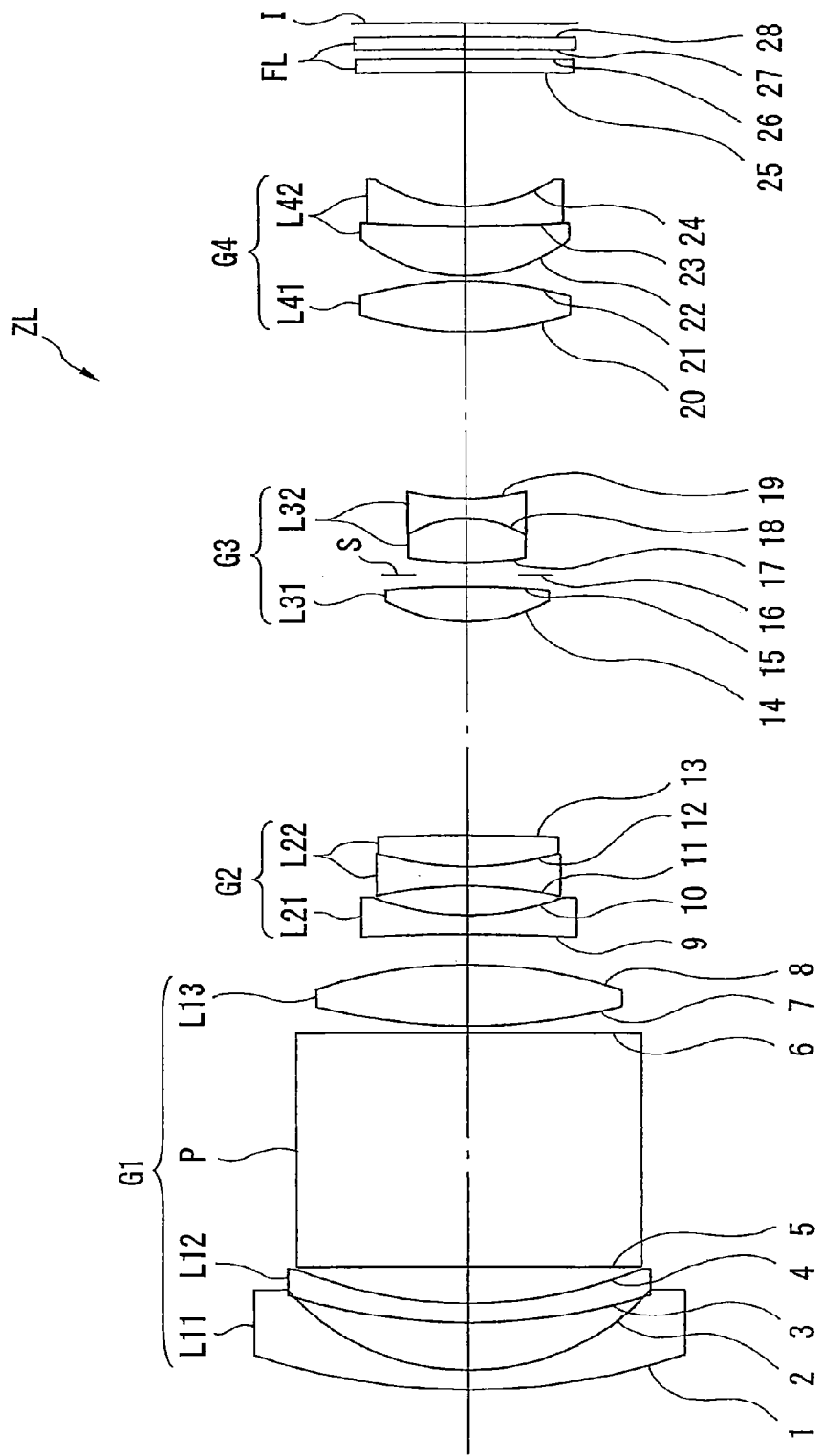
FIG. 9 is a cross-sectional view of the constitution of the zoom lens according to Example 2.

Example 2 of this application will be described hereinbelow with reference to FIGS. 9 to 12 and Table 2. FIG. 9 shows the constitution of the zoom lens according to Example 2. The zoom lens of Example 2 has the same constitution as that of the zoom lens of Example 1 except for the constitution of the second lens group and a detailed description is omitted by assigning the same reference numerals to the respective parts as in the case of Example 1. The second lens group G2 of Example 2 comprises, in order from the object, a two-sided concave shape negative lens L21 which has an aspherical surface on the image and a negative composite lens L22 made by sticking together a two-sided concave shape negative lens and a two-sided convex shape positive lens.

Table 2 below shows the respective parameters of Example 2. The surface numbers 1 to 28 of Table 2 correspond to the surfaces 1 to 28 in FIG. 9. Further, according to Example 2, the respective lens surfaces of the seventh, tenth, fourteenth and twenty-first surfaces are formed with an aspherical shape.

TABLE 2

[All parameters]

| Wide-angle end | | intermediate focal length | | telephoto end |
|---|---|---|---|---|
| f = 4.76 | to | 10.83 | to | 16.83 |
| F.No = 3.69 | to | 4.63 | to | 5.63 |
| 2ω = 80.13 | to | 37.46 | to | 24.50 |

[Lens parameters]

| Surface number | Radius of curvature | Surface distance | Refractive index | Abbe number |
|---|---|---|---|---|
| 1 | 24.0157 | 0.80 | 1.94594 | 17.98 |
| 2 | 8.8935 | 1.93 | | |
| 3 | 21.2986 | 0.80 | 2.00069 | 25.46 |
| 4 | 16.1029 | 1.50 | | |
| 5 | 0.0000 | 9.60 | 1.88300 | 40.76 |
| 6 | 0.0000 | 0.30 | | |
| 7* | 19.6885 | 2.55 | 1.77377 | 47.17 |
| 8 | −16.7162 | (d8) | | |
| 9 | −71.9418 | 0.80 | 1.85135 | 40.10 |
| 10* | 9.2063 | 1.22 | | |
| 11 | −14.8404 | 0.80 | 1.81600 | 46.62 |
| 12 | 10.8518 | 1.31 | 1.94594 | 17.98 |
| 13 | −67.4208 | (d13) | | |
| 14* | 5.9953 | 1.45 | 1.58913 | 61.25 |
| 15 | −36.9608 | 0.50 | | |
| 16 | 0.0000 | 0.50 | | (aperture stop S) |
| 17 | 13.8168 | 1.85 | 1.64000 | 60.08 |
| 18 | −4.0035 | 0.80 | 1.83481 | 42.71 |
| 19 | 8.2259 | (d19) | | |
| 20 | 11.9130 | 2.09 | 1.58913 | 61.25 |
| 21* | −11.2129 | 0.20 | | |
| 22 | 5.9451 | 2.05 | 1.49700 | 81.54 |
| 23 | 64.9268 | 0.80 | 1.84666 | 23.78 |
| 24 | 5.6786 | (d24) | | |
| 25 | 0.0000 | 0.55 | 1.54437 | 70.51 |
| 26 | 0.0000 | 0.40 | | |
| 27 | 0.0000 | 0.50 | 1.51633 | 64.14 |
| 28 | 0.0000 | (Bf) | | |

TABLE 2-continued

[Aspherical surface data]

| Surface number | K | C4 | C6 | C8 | C10 |
|---|---|---|---|---|---|
| 7 | −3.6294 | +1.6073 × 10$^{-5}$ | −4.6863 × 10$^{-7}$ | +4.0036 × 10$^{-9}$ | −2.0969 × 10$^{-11}$ |
| 10 | −9.0000 | +1.5122 × 10$^{-3}$ | −5.1954 × 10$^{-5}$ | +1.0103 × 10$^{-6}$ | +3.8507 × 10$^{-8}$ |
| 14 | +0.4518 | +1.7174 × 10$^{-4}$ | +1.9840 × 10$^{-5}$ | +1.6119 × 10$^{-8}$ | +4.3659 × 10$^{-8}$ |
| 21 | +6.5379 | +8.9943 × 10$^{-4}$ | +2.2966 × 10$^{-5}$ | −4.2505 × 10$^{-7}$ | +8.1325 × 10$^{-8}$ |

[Variable distance]

| | Wide-angle end | intermediate focal length | telephoto end |
|---|---|---|---|
| f | 4.7600 | 10.8344 | 16.8300 |
| d8 | 1.2428 | 7.0385 | 9.0846 |
| d13 | 8.8916 | 3.0958 | 1.0500 |
| d19 | 6.9489 | 3.3971 | 1.1000 |
| d24 | 5.5049 | 9.0566 | 11.3537 |
| Bf | 0.5998 | 0.5999 | 0.5998 |

[Condition mapping values]

βaw = 15.64980
βbw = −0.04617
Ymax = 3.75000
fw = 4.75998
fs(f3) = 16.49704
L1 = 4.03
Lp = 9.60
ndp = 1.88300
Conditional expression (1) L1/Lp = 0.420
Conditional expression (2) ndp = 1.88300
Conditional expression (3) βbw × (1 − βaw)/(Ymax/fw) = 0.8585
Conditional expression (4) fw/fs = 0.2885

Thus, it is clear that the above conditional expressions (1) to (4) are all satisfied by this example.

Figure 10A:
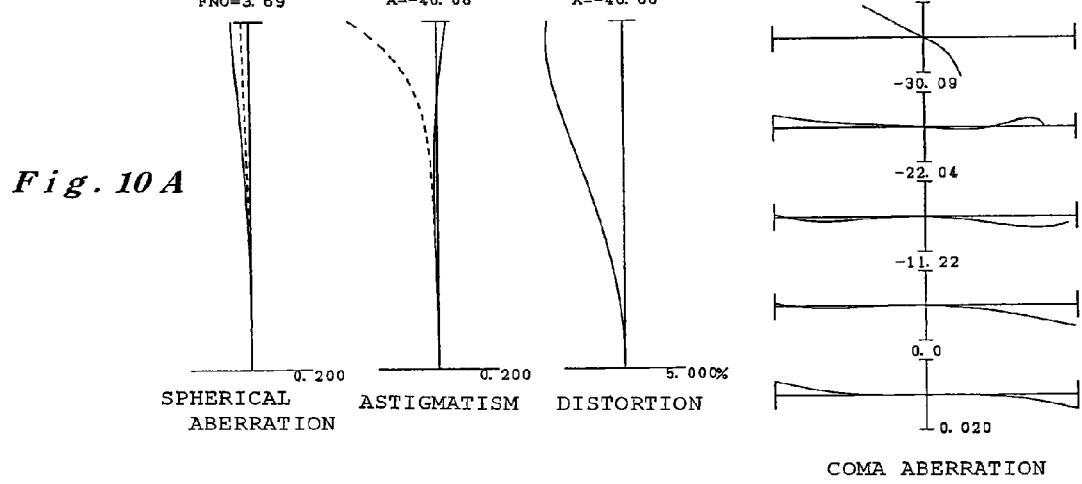
FIG. 10A is a graph showing various aberrations of the zoom lens according to Example 2 upon focusing on infinity in the wide-angle end state.
Figure 10B:
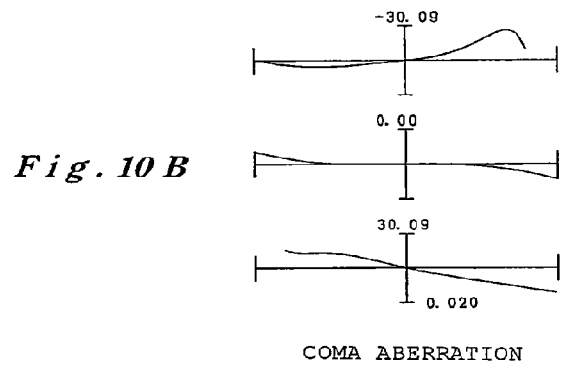
FIG. 10B is a lateral aberration graph during lens shifting in the wide-angle end state according to Example 2.
Figure 11A:
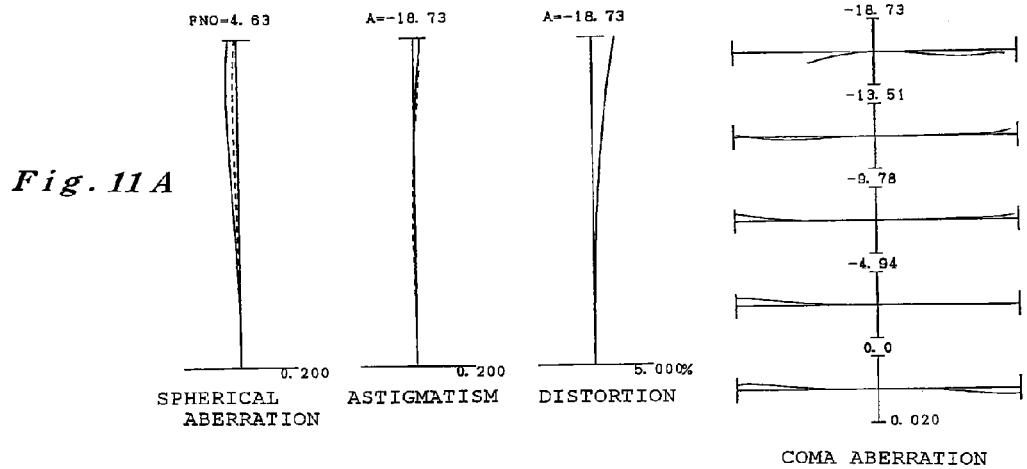
FIG. 11A is a graph showing various aberrations of the zoom lens according to Example 2 upon focusing on infinity in the intermediate focal length state.
Figure 11B:
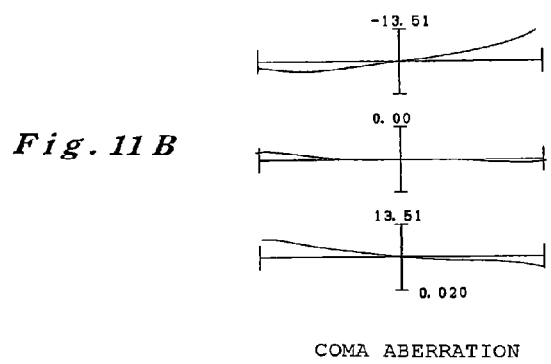
FIG. 11B is a lateral aberration graph during lens shifting in the intermediate focal length state according to Example 2.
Figure 12A:
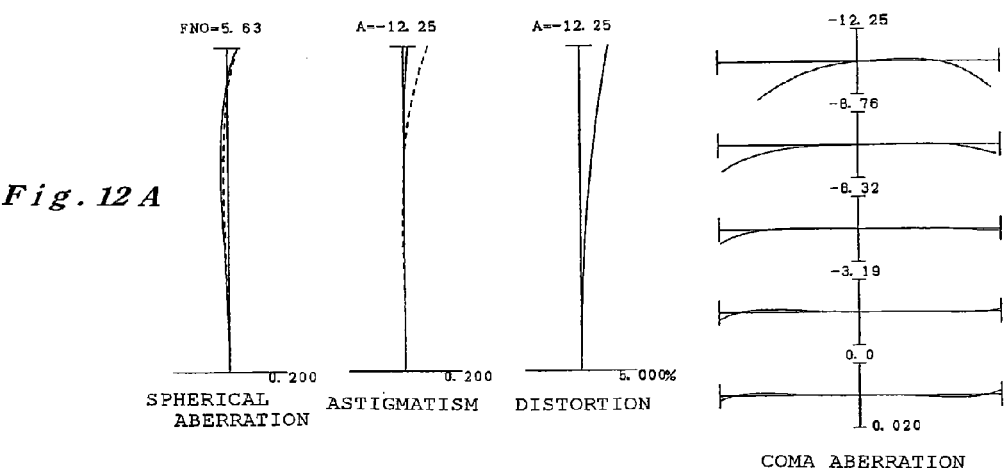
FIG. 12A is a graph showing various aberrations of the zoom lens according to Example 2 upon focusing on infinity in the telephoto end state.
Figure 12B:
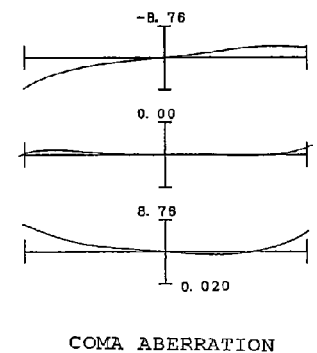
FIG. 12B a lateral aberration graph during lens shifting in the telephoto end state according to Example 2.

FIGS. 10 to 12 are graphs showing various aberrations of Example 2 with respect to d-line (wavelength λ=587.6 nm). That is, FIG. 10A is a graph showing various aberrations of the zoom lens according to Example 2 focusing on infinity in the wide-angle end state (f=4.76 mm); FIG. 10B is a lateral aberration graph during lens shifting in the wide-angle end state according to Example 2; FIG. 11A is a graph showing various aberrations of the zoom lens according to Example 2 focusing on infinity in the intermediate focal length state (f=10.83 mm); FIG. 11B is a lateral aberration graph during lens shifting in the intermediate focal length state according to Example 2; FIG. 12A is a graph showing various aberrations of the zoom lens according to Example 2 focusing on infinity in the telephoto end state (f=16.83 mm); FIG. 12B is a lateral aberration graph during lens shifting in the telephoto end state according to Example 2. Further, as is evident from the respective aberrations graphs, it is clear that, according to Example 2, the various aberrations are favorably corrected in each focal length state from the wide-angle end state to the telephoto end state and Example 2 has superior image formation performance.

Example 3

Figure 13:
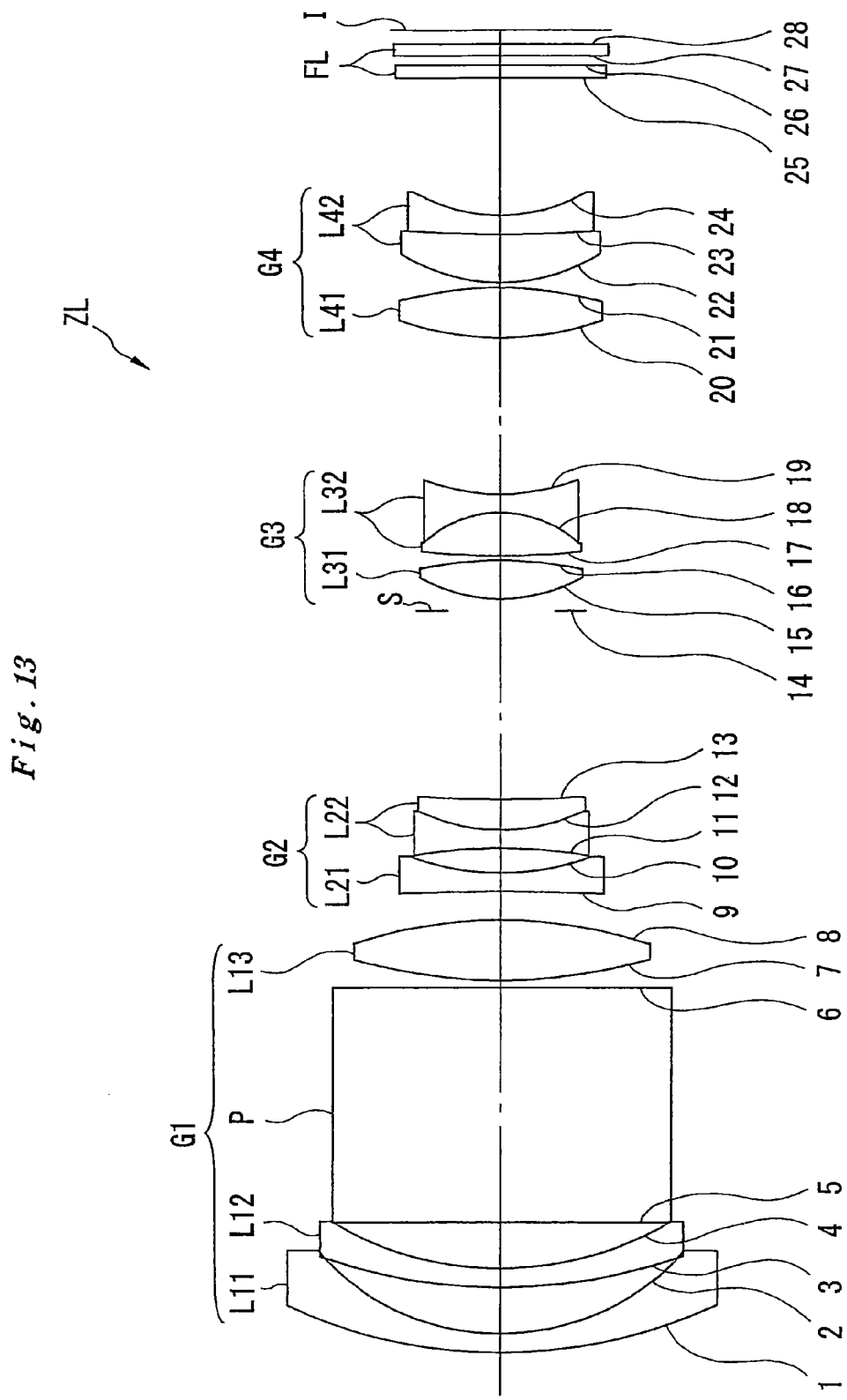
FIG. 13 is a cross-sectional view of the constitution of the zoom lens according to Example 3.

Example 3 of this application will be described hereinbelow by using FIGS. 13 to 16 and Table 3. FIG. 13 shows the constitution of the zoom lens according to Example 3. The zoom lens of Example 3 has the same constitution as the zoom lens of Example 1 except for the constitution of the aperture stop and a detailed description is omitted here by assigning the same reference numerals to the respective parts as in the case of Example 1. The aperture stop S of Example 3 is disposed closest to the object of the third lens group G3 and is fixed to the imaging surface I during zooming from the wide-angle end to the telephoto end.

Table 3 below shows the respective parameters of Example 3. The surface numbers 1 to 28 in Table 3 correspond to surfaces 1 to 28 in FIG. 13. Further, according to Example 3, the respective lens surfaces of the seventh, tenth, fifteenth and twenty-first surfaces are formed with an aspherical shape.

TABLE 3

[All parameters]

| Wide-angle end | | intermediate focal length | | telephoto end |
|---|---|---|---|---|
| f = 4.76 | to | 10.90 | to | 16.83 |
| F.No = 3.61 | to | 4.48 | to | 5.31 |
| 2ω = 80.08 | to | 37.30 | to | 24.50 |

TABLE 3-continued

[Lens parameters]

| Surface number | Radius of curvature | Surface distance | Refractive index | Abbe number |
|---|---|---|---|---|
| 1 | 18.6003 | 0.80 | 1.94594 | 17.98 |
| 2 | 9.1299 | 1.95 | | |
| 3 | 20.0061 | 0.80 | 1.94594 | 17.98 |
| 4 | 12.2378 | 1.95 | | |
| 5 | 0.0000 | 10.00 | 1.83400 | 37.16 |
| 6 | 0.0000 | 0.30 | | |
| 7* | 17.6318 | 2.59 | 1.77377 | 47.17 |
| 8 | −17.0143 | (d8) | | |
| 9 | −95.1601 | 0.80 | 1.85135 | 40.10 |
| 10* | 9.6243 | 1.05 | | |
| 11 | −18.7968 | 0.80 | 1.81600 | 46.62 |
| 12 | 7.0462 | 1.31 | 1.94594 | 17.98 |
| 13 | 49.4372 | (d13) | | |
| 14 | 0.0000 | 0.50 | | (aperture stop S) |
| 15* | 5.7357 | 1.66 | 1.58913 | 61.25 |
| 16 | −13.8410 | 0.20 | | |
| 17 | 27.9825 | 1.85 | 1.65160 | 58.55 |
| 18 | −4.2034 | 0.80 | 1.83481 | 42.71 |
| 19 | 7.6543 | (d19) | | |
| 20 | 11.0138 | 2.15 | 1.60602 | 57.44 |
| 21* | −11.6568 | 0.20 | | |
| 22 | 6.7719 | 2.05 | 1.49700 | 81.54 |
| 23 | 43.7568 | 0.80 | 1.92286 | 20.88 |
| 24 | 6.2063 | (d24) | | |
| 25 | 0.0000 | 0.55 | 1.54437 | 70.51 |
| 26 | 0.0000 | 0.40 | | |
| 27 | 0.0000 | 0.50 | 1.51633 | 64.14 |
| 28 | 0.0000 | (Bf) | | |

[Aspherical surface data]

| Surface number | K | C4 | C6 | C8 | C10 |
|---|---|---|---|---|---|
| 7 | −3.5829 | $+3.1195 \times 10^{-5}$ | $-6.5188 \times 10^{-7}$ | $+8.6095 \times 10^{-10}$ | $+4.2745 \times 10^{-11}$ |
| 10 | −9.0000 | $+1.3893 \times 10^{-3}$ | $-3.2887 \times 10^{-5}$ | $-2.9925 \times 10^{-7}$ | $+1.1579 \times 10^{-7}$ |
| 15 | +0.1967 | $+5.0256 \times 10^{-5}$ | $+6.1634 \times 10^{-6}$ | $+2.2998 \times 10^{-6}$ | $-1.2189 \times 10^{-7}$ |
| 21 | +0.6898 | $+3.7981 \times 10^{-4}$ | $+7.2724 \times 10^{-6}$ | $-9.6564 \times 10^{-8}$ | $-5.0538 \times 10^{-9}$ |

[Variable distance]

| | Wide-angle end | intermediate focal length | telephoto end |
|---|---|---|---|
| f | 4.7600 | 10.8950 | 16.8300 |
| d8 | 1.2203 | 6.3686 | 8.2935 |
| d13 | 8.1217 | 2.9734 | 1.0485 |
| d19 | 6.7033 | 3.1869 | 1.1000 |
| d24 | 5.8354 | 9.3517 | 11.4386 |
| Bf | 0.6000 | 0.6000 | 0.6000 |

[Condition mapping values]

$\beta aw$ = 14.35970
$\beta bw$ = −0.05428
Ymax = 3.75000
fw = 4.7600
fs(f3) = 15.97021
L1 = 5.50
Lp = 10.00
ndp = 1.83400
Conditional expression (1) L1/Lp = 0.550
Conditional expression (2) ndp = 1.83400
Conditional expression (3) $\beta bw \times (1 - \beta aw)/(Ymax/fw)$ = 0.9205
Conditional expression (4) fw/fs = 0.2981

Thus, it is clear that the above conditional expressions (1) to (4) are all satisfied by this example.

Figure 14A:
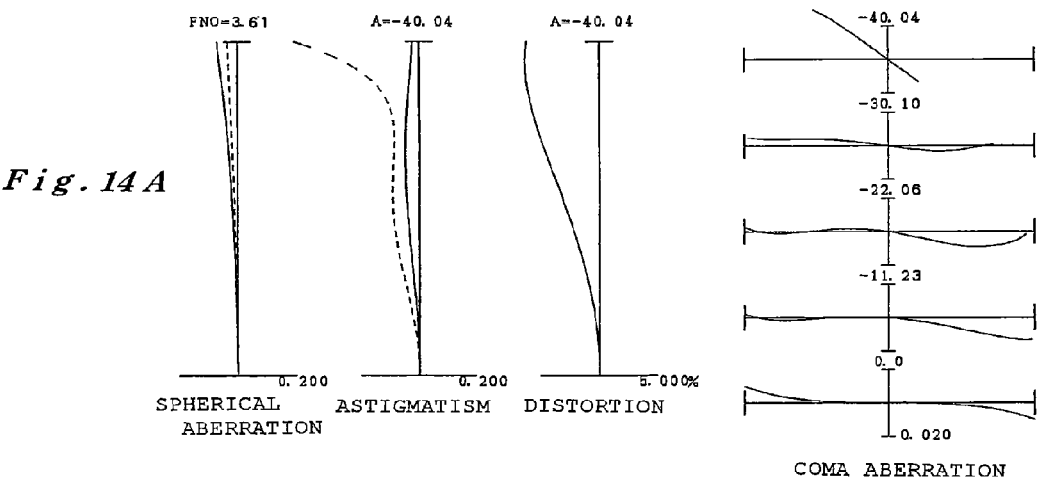
FIG. 14A is a graph showing various aberrations of the zoom lens according to Example 3 upon focusing on infinity in the wide-angle end state.
Figure 14B:
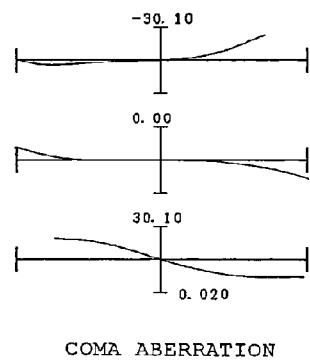
FIG. 14B is a lateral aberration graph during lens shifting in the wide-angle end state according to Example 3.
Figure 15A:
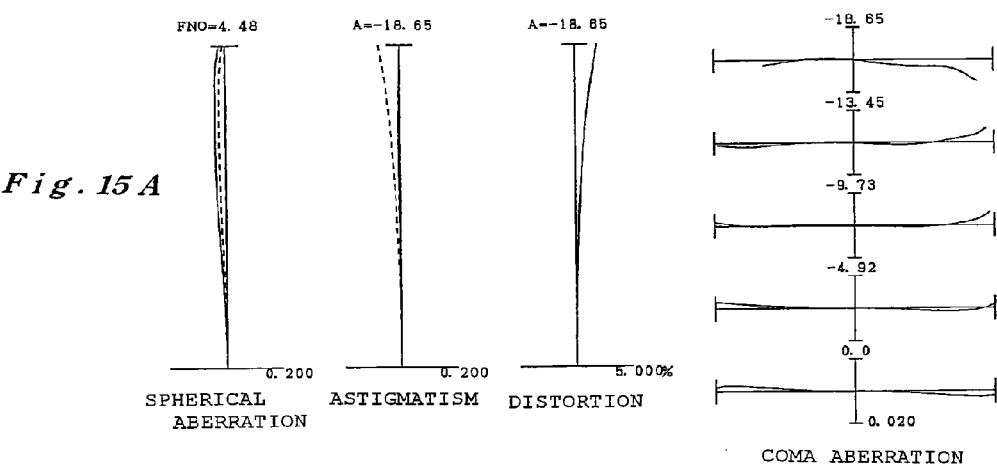
FIG. 15A is a graph showing various aberrations of the zoom lens according to Example 3 upon focusing on infinity in the intermediate focal length state.
Figure 15B:
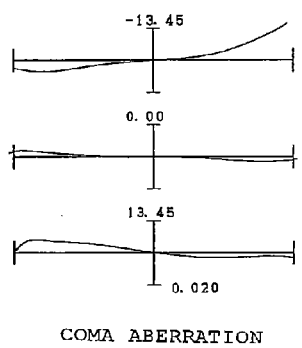
FIG. 15B is a lateral aberration graph during lens shifting in the intermediate focal length state according to Example 3.
Figure 16A:
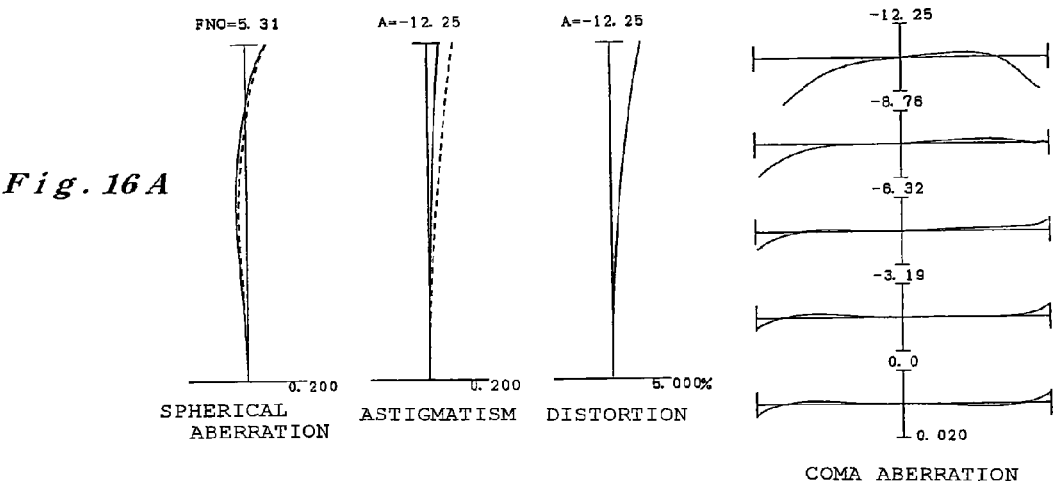
FIG. 16A is a graph showing various aberrations of the zoom lens according to Example 3 upon focusing on infinity in the telephoto end state.
Figure 16B:
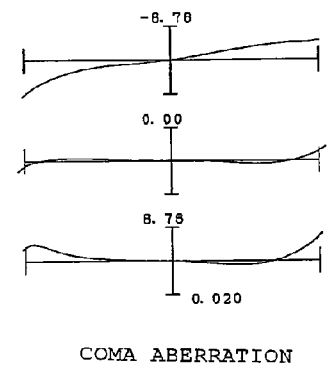
FIG. 16B a lateral aberration graph during lens shifting in the telephoto end state according to Example 3.

FIGS. 14 to 16 are graphs showing various aberrations of Example 3 with respect to d-line (wavelength λ=587.6 nm). That is, FIG. 14A is a graph showing various aberrations of the zoom lens according to Example 3 focusing on infinity in the wide-angle end state (f=4.76 mm); FIG. 14B is a lateral aberration graph during lens shifting in the wide-angle end state according to Example 3; FIG. 15A is a graph showing various aberrations of the zoom lens according to Example 3 focusing on infinity in the intermediate focal length state (f=10.90 mm); FIG. 15B is a lateral aberration graph during lens shifting in the intermediate focal length according to Example 3; FIG. 16A is a graph showing various aberrations of the zoom lens according to Example 3 focusing on infinity in the telephoto end state (f=16.83 mm); and FIG. 16B is a lateral aberration graph during lens shifting in the telephoto end state according to Example 3. Further, as is evident from the respective aberration graphs, it is clear that, according to Example 3, the various aberrations are favorably corrected in the respective focal length states from the wide-angle end state to the telephoto end state and Example 3 possesses superior image formation performance.

Example 4

Figure 17:
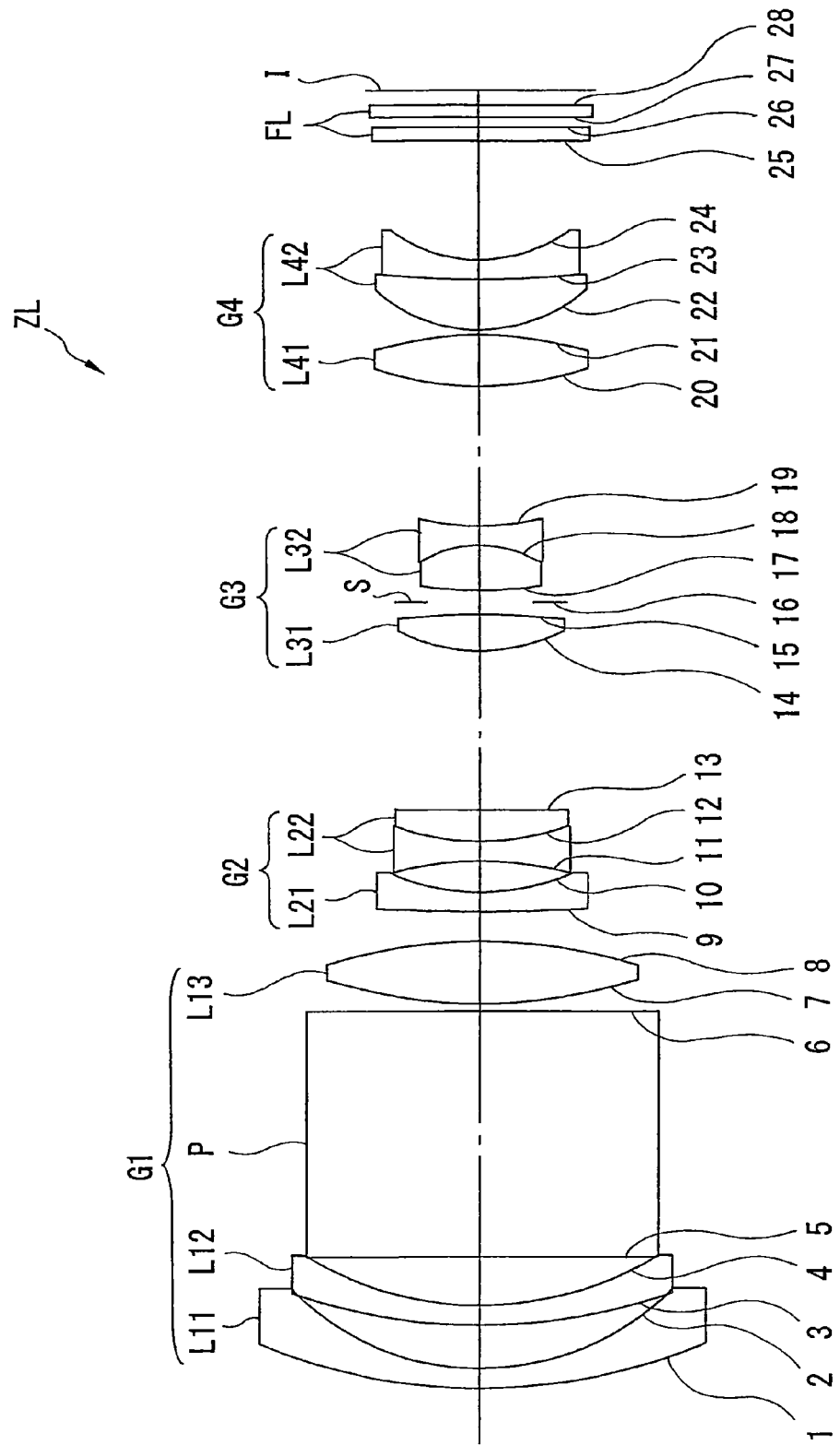
FIG. 17 is a cross-sectional view of the constitution of the zoom lens according to Example 4.

Example 4 of this application will be described hereinbelow by using FIGS. 17 to 20 and Table 4. FIG. 17 shows the constitution of the zoom lens according to Example 4. The zoom lens of Example 4 has the same constitution as the zoom lens of Example 1 except for the constitution of the second lens group and a detailed description is omitted here by assigning the same reference numerals to the respective parts as in the case of Example 1. The second lens group G2 of Example 4 comprises, in order from the object, a negative meniscus lens L21 whose concave surface faces the image and which comprises an aspherical surface on the image and a negative composite lens L22 made by sticking together a two-sided concave shape negative lens and a positive meniscus lens having a convex surface facing the object.

Table 4 below shows the respective parameters of Example 4. The surface numbers 1 to 28 in Table 4 correspond to surfaces 1 to 28 in FIG. 17. Further, according to Example 4, the respective lens surfaces of the seventh, tenth, fourteenth and twenty-first surfaces are formed with an aspherical shape.

TABLE 4

| [All parameters] | | | | |
|---|---|---|---|---|
| Wide-angle end | | intermediate focal length | | telephoto end |
| f = 4.76 | to | 10.90 | to | 13.60 |
| F.No = 3.35 | to | 4.42 | to | 4.94 |
| 2ω = 80.12 | to | 37.28 | to | 30.08 |

| [Lens parameters] | | | | |
|---|---|---|---|---|
| Surface number | Radius of curvature | Surface distance | Refractive index | Abbe number |
| 1 | 20.0659 | 0.80 | 1.94594 | 17.98 |
| 2 | 9.4663 | 1.74 | | |
| 3 | 19.9098 | 0.80 | 1.94594 | 17.98 |
| 4 | 11.8056 | 1.95 | | |
| 5 | 0.0000 | 10.00 | 1.88300 | 40.76 |
| 6 | 0.0000 | 0.30 | | |
| 7* | 16.0291 | 2.57 | 1.77377 | 47.17 |
| 8 | −17.9853 | (d8) | | |
| 9 | 61.2821 | 0.80 | 1.85135 | 40.10 |
| 10* | 8.0895 | 1.27 | | |
| 11 | −11.8561 | 0.80 | 1.81600 | 46.62 |
| 12 | 8.4147 | 1.31 | 1.94594 | 17.98 |
| 13 | 737.0197 | (d13) | | |
| 14* | 6.1454 | 1.49 | 1.58913 | 61.25 |
| 15 | −27.6421 | 0.50 | | |
| 16 | 0.0000 | 0.50 | | (aperture stop S) |
| 17 | 14.0938 | 1.85 | 1.65160 | 58.55 |
| 18 | −4.0061 | 0.80 | 1.83481 | 42.71 |
| 19 | 8.7909 | (d19) | | |
| 20 | 10.9036 | 2.12 | 1.60602 | 57.44 |
| 21* | −10.6070 | 0.20 | | |
| 22 | 5.5336 | 2.05 | 1.49700 | 81.54 |
| 23 | 34.8603 | 0.80 | 1.92286 | 20.88 |
| 24 | 5.2528 | (d24) | | |
| 25 | 0.0000 | 0.55 | 1.54437 | 70.51 |
| 26 | 0.0000 | 0.40 | | |
| 27 | 0.0000 | 0.50 | 1.51633 | 64.14 |
| 28 | 0.0000 | (Bf) | | |

| [Aspherical surface data] | | | | | |
|---|---|---|---|---|---|
| Surface number | K | C4 | C6 | C8 | C10 |
| 7 | −4.0230 | $+7.0504 \times 10^{-5}$ | $-1.2539 \times 10^{-6}$ | $+1.4715 \times 10^{-8}$ | $-1.3631 \times 10^{-10}$ |
| 10 | −9.0000 | $+2.2831 \times 10^{-3}$ | $-1.0263 \times 10^{-4}$ | $+4.6258 \times 10^{-6}$ | $-1.9824 \times 10^{-8}$ |
| 14 | +0.3051 | $+1.1920 \times 10^{-4}$ | $+1.9083 \times 10^{-5}$ | $+5.5497 \times 10^{-7}$ | $+4.4974 \times 10^{-9}$ |
| 21 | +3.0851 | $+7.3914 \times 10^{-4}$ | $+4.7542 \times 10^{-6}$ | $+7.2955 \times 10^{-7}$ | $-3.1537 \times 10^{-8}$ |

| [Variable distance] | | | |
|---|---|---|---|
| | Wide-angle end | intermediate focal length | telephoto end |
| f | 4.7600 | 10.8950 | 13.6000 |
| d8 | 1.2138 | 5.8763 | 6.7098 |
| d13 | 6.5459 | 1.8835 | 1.0500 |

TABLE 4-continued

| d19 | 5.7301 | 2.2438 | 1.1000 |
|---|---|---|---|
| d24 | 4.8182 | 8.3044 | 9.4483 |
| Bf | 0.5999 | 0.5999 | 0.5998 |

[Condition mapping values]

$\beta aw = 9.82821$
$\beta bw = -0.07995$
Ymax = 3.75000
fw = 4.76003
fs(f3) = 14.44108
L1 = 5.29
Lp = 10.00
ndp = 1.88300
Conditional expression (1) L1/Lp = 0.529
Conditional expression (2) ndp = 1.88300
Conditional expression (3) $\beta bw \times (1 - \beta aw)/(Ymax/fw) = 0.8959$
Conditional expression (4) fw/fs = 0.3296

Thus, it is clear that the above conditional expressions (1) to (4) are all satisfied by this example.

Figure 19A:
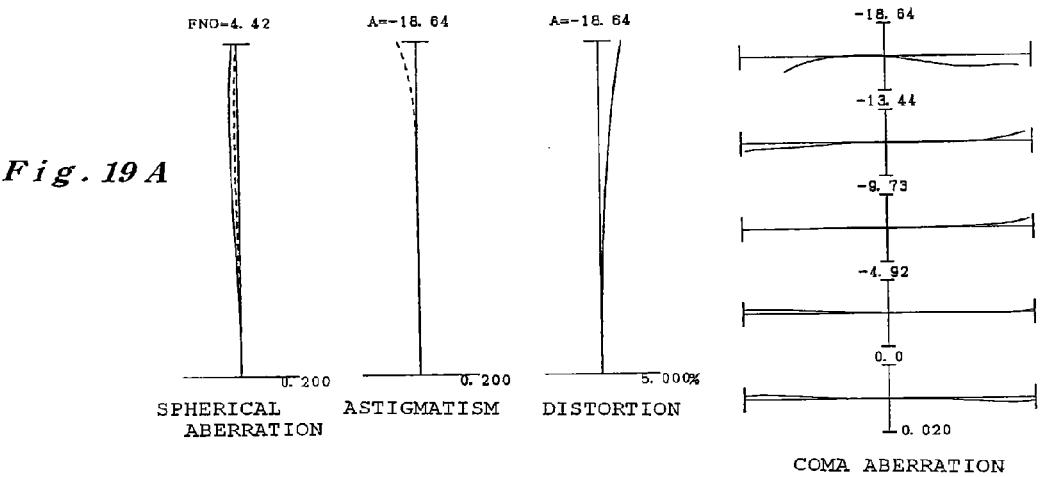
FIG. 19A is a graph showing various aberrations of the zoom lens according to Example 4 upon focusing on infinity in the intermediate focal length state.
Figure 19B:
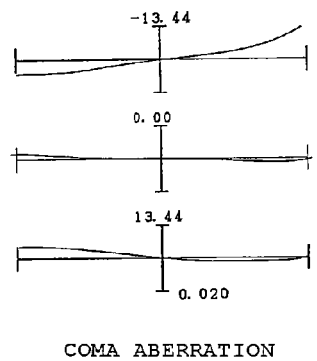
FIG. 19B is a lateral aberration graph during lens shifting in the intermediate focal length state according to Example 4.
Figure 20A:
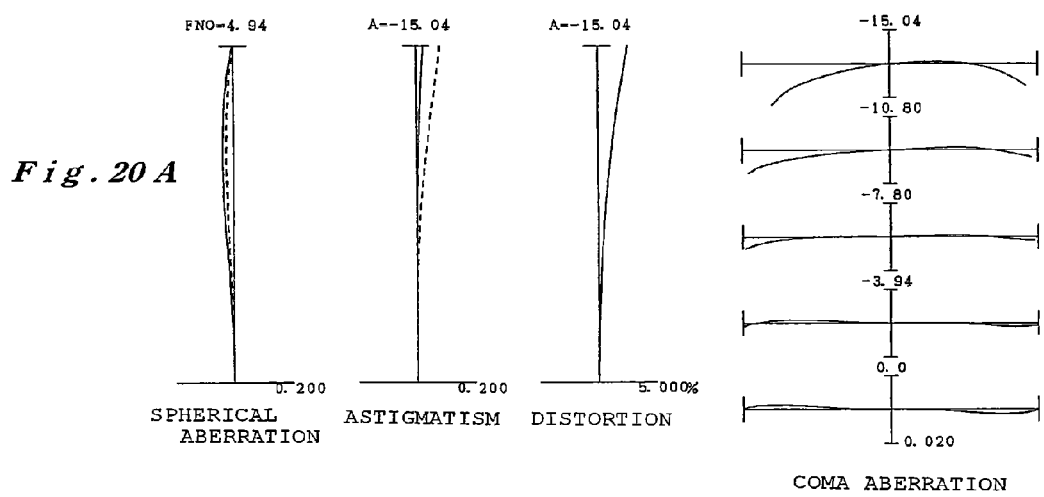
FIG. 20A is a graph showing various aberrations of the zoom lens according to Example 4 upon focusing on infinity in the telephoto end state.
Figure 20B:
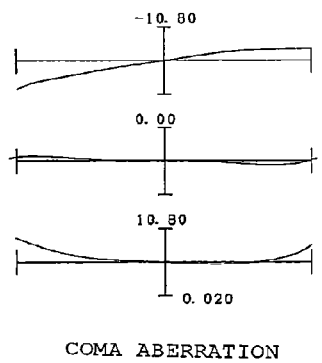
FIG. 20B is a lateral aberration graph during lens shifting in the telephoto end state according to Example 4.

FIGS. 18 to 20 are graphs showing various aberrations of Example 4 with respect to d-line (wavelength λ=587.6 nm). That is, FIG. 18A is a graph showing various aberrations of the zoom lens according to Example 4 focusing on infinity in the wide-angle end state (f=4.76 mm); FIG. 18B is a lateral aberration graph during lens shifting in the wide-angle end state according to Example 4; FIG. 19A is a graph showing various aberrations of the zoom lens according to Example 4 focusing on infinity in the intermediate focal length state (f=10.90 mm); FIG. 19B is a lateral aberration graph during lens shifting in the intermediate focal length according to Example 4; FIG. 20A is a graph showing various aberrations of the zoom lens according to Example 4 focusing on infinity in the telephoto end state (f=13.60 mm); and FIG. 20B is the lateral aberration graph during lens shifting in the telephoto end state according to Example 4. Further, as is evident from the respective aberration graphs, it is clear that, according to Example 4, the various aberrations are favorably corrected in the respective focal length states from the wide-angle end state to the telephoto end state and Example 4 possesses superior image formation performance.

Example 5

Figure 21:
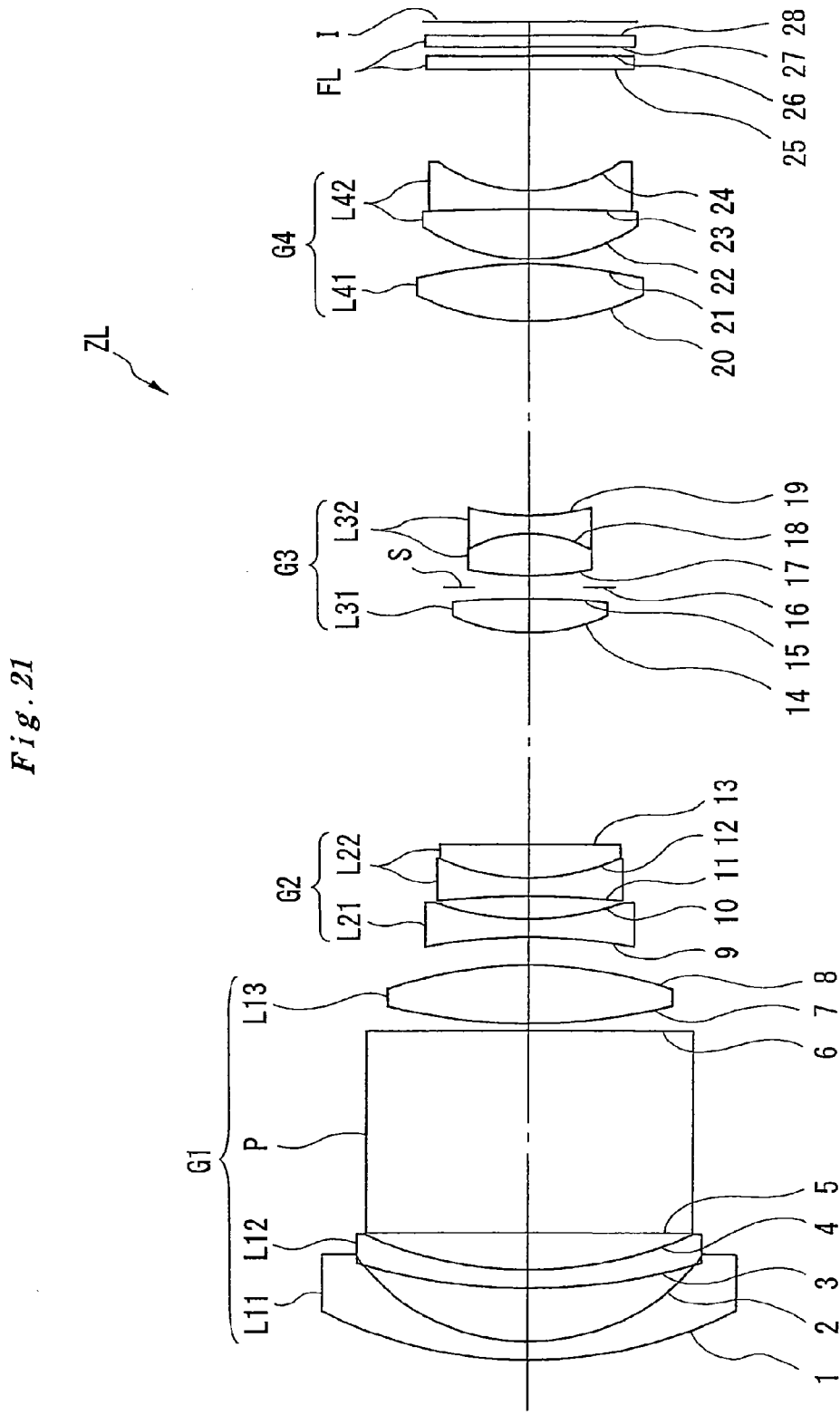
FIG. 21 is a cross-sectional view of the constitution of the zoom lens according to Example 5.

Example 5 of this application will be described hereinbelow with reference to FIGS. 21 to 24 and Table 5. FIG. 21 shows the constitution of the zoom lens according to Example 5. The zoom lens of Example 5 has the same constitution as that of the zoom lens of Example 1 except for the constitution of the second lens group and the fourth lens group and a detailed description is omitted by assigning the same reference numerals to the respective parts as in the case of Example 1. The second lens group G2 of Example 5 comprises, in order from the object, a two-sided concave shape negative lens L21 which has an aspherical surface on the image and a negative composite lens L22 made by sticking together a two-sided concave shape negative lens and a two-sided convex shape positive lens. Furthermore, the fourth lens group G4 of Example 5 comprises, in order from the object, a two-sided convex shape positive lens L41 which has an aspherical surface on the image and a negative composite lens L42 made by sticking together a two-sided convex shape positive lens and a two-sided concave shape negative lens.

Table 5 below shows the respective parameters of Example 5. The surface numbers 1 to 28 in Table 5 correspond to surfaces 1 to 28 in FIG. 21. Further, according to Example 5, the respective lens surfaces of the seventh, tenth, fourteenth and twenty-first surfaces are formed with an aspherical shape.

TABLE 5

[All parameters]

| Wide-angle end | | intermediate focal length | | telephoto end |
|---|---|---|---|---|
| f = 4.76 | to | 10.83 | to | 19.20 |
| F.No = 3.47 | to | 4.34 | to | 5.75 |
| 2ω = 80.20 | to | 37.30 | to | 21.54 |

[Lens parameters]

| Surface number | Radius of curvature | Surface distance | Refractive index | Abbe number |
|---|---|---|---|---|
| 1 | 17.2732 | 0.80 | 1.94594 | 17.98 |
| 2 | 8.3539 | 2.29 | | |
| 3 | 22.2424 | 0.80 | 2.00069 | 25.46 |
| 4 | 14.8265 | 1.60 | | |
| 5 | 0.0000 | 8.80 | 1.88300 | 40.76 |
| 6 | 0.0000 | 0.30 | | |
| 7* | 19.9314 | 2.56 | 1.76802 | 49.24 |
| 8 | -16.2242 | (d8) | | |
| 9 | -21.2094 | 0.80 | 1.85135 | 40.10 |
| 10* | 9.8366 | 1.00 | | |
| 11 | -34.3738 | 0.80 | 1.83481 | 42.71 |

TABLE 5-continued

| | | | | |
|---|---|---|---|---|
| 12 | 7.9969 | 1.47 | 1.94594 | 17.98 |
| 13 | −1158.0055 | (d13) | | |
| 14* | 6.6673 | 1.51 | 1.59201 | 67.05 |
| 15 | −28.2642 | 0.50 | | |
| 16 | 0.0000 | 0.50 | | (aperture stop S) |
| 17 | 11.6221 | 1.85 | 1.64000 | 60.08 |
| 18 | −4.6955 | 0.80 | 1.88300 | 40.76 |
| 19 | 8.8567 | (d19) | | |
| 20 | 9.5123 | 2.50 | 1.59201 | 67.05 |
| 21* | −12.9644 | 0.20 | | |
| 22 | 7.1445 | 2.15 | 1.49700 | 81.54 |
| 23 | −85.6130 | 0.80 | 1.79504 | 28.54 |
| 24 | 5.8608 | (d24) | | |
| 25 | 0.0000 | 0.60 | 1.54437 | 70.51 |
| 26 | 0.0000 | 0.40 | | |
| 27 | 0.0000 | 0.50 | 1.51633 | 64.14 |
| 28 | 0.0000 | (Bf) | | |

[Aspherical surface data]

| Surface number | K | C4 | C6 | C8 | C10 |
|---|---|---|---|---|---|
| 7 | −7.6332 | +8.1356 × 10$^{-5}$ | −1.1855 × 10$^{-6}$ | +1.0910 × 10$^{-8}$ | −6.9554 × 10$^{-11}$ |
| 10 | −9.0000 | +1.1174 × 10$^{-3}$ | −4.2945 × 10$^{-5}$ | +1.3369 × 10$^{-6}$ | −3.3511 × 10$^{-9}$ |
| 14 | +0.4936 | +1.6354 × 10$^{-4}$ | +5.3401 × 10$^{-6}$ | +9.8630 × 10$^{-7}$ | −2.7231 × 10$^{-8}$ |
| 21 | +2.0477 | +5.2136 × 10$^{-4}$ | +6.2688 × 10$^{-7}$ | +2.6776 × 10$^{-7}$ | −1.2539 × 10$^{-8}$ |

[Variable distance]

| | Wide-angle end | intermediate focal length | telephoto end |
|---|---|---|---|
| f | 4.7600 | 10.8344 | 19.2000 |
| d8 | 1.2308 | 7.1168 | 9.5209 |
| d13 | 9.3400 | 3.4541 | 1.0500 |
| d19 | 8.5106 | 4.5925 | 1.1000 |
| d24 | 5.2744 | 9.1924 | 12.6849 |
| Bf | 0.5999 | 0.6000 | 0.6000 |

[Condition mapping values]

βaw = 35.62253
βbw = −0.02083
Ymax = 3.75000
fw = 4.75999
fs(f3) = 16.32981
L1 = 5.49
Lp = 8.80
ndp = 1.88300
Conditional expression (1) L1/Lp = 0.625
Conditional expression (2) ndp = 1.88300
Conditional expression (3) βbw × (1 − βaw)/(Ymax/fw) = 0.9154
Conditional expression (4) fw/fs = 0.2915

Thus, it is clear that the above conditional expressions (1) to (4) are all satisfied by this example.

Figure 22A:
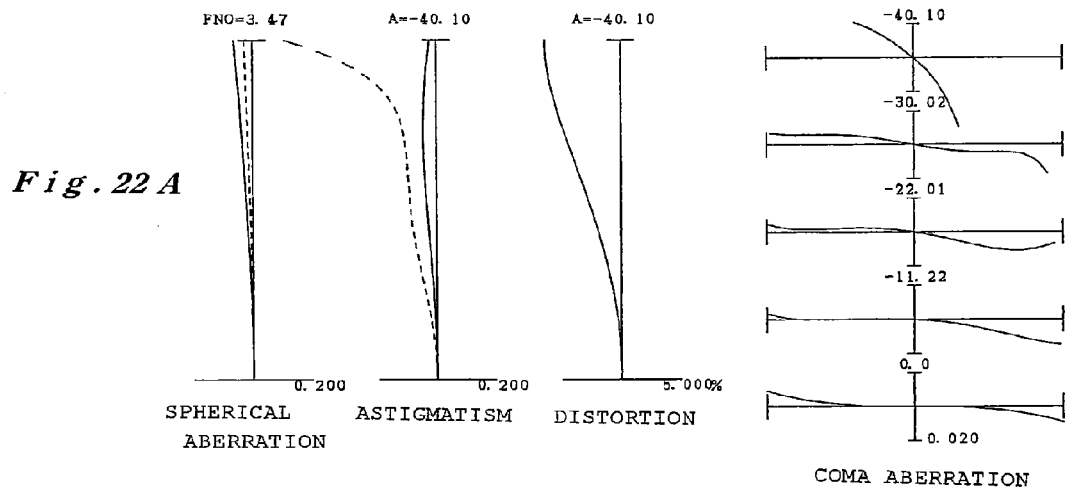
FIG. 22A is a graph showing various aberrations of the zoom lens according to Example 5 upon focusing on infinity in the wide-angle end state.
Figure 22B:
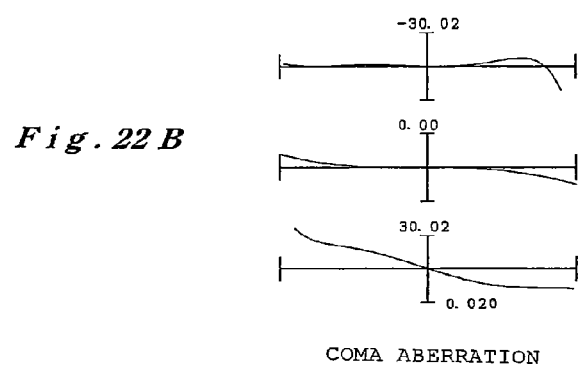
FIG. 22B is a lateral aberration graph during lens shifting in the wide-angle end state according to Example 5.
Figure 23A:
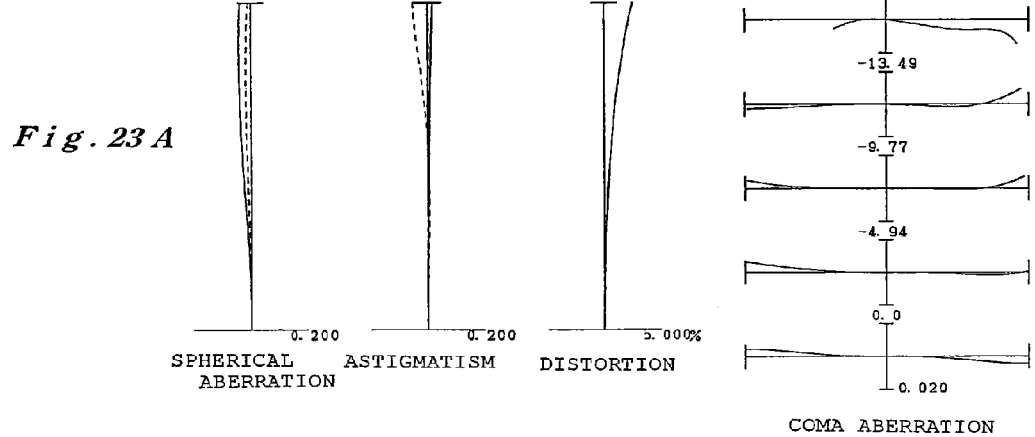
FIG. 23A is a graph showing various aberrations of the zoom lens according to Example 5 upon focusing on infinity in the intermediate focal length state.
Figure 23B:
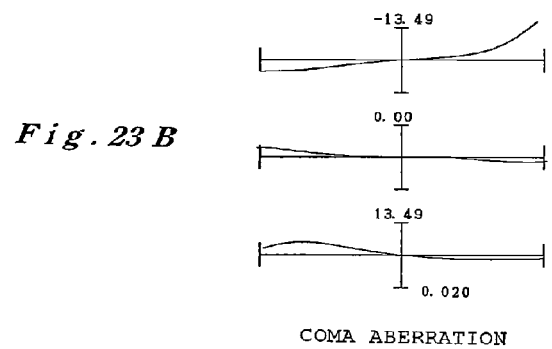
FIG. 23B is a lateral aberration graph during lens shifting in the intermediate focal length state according to Example 5.
Figure 24A:
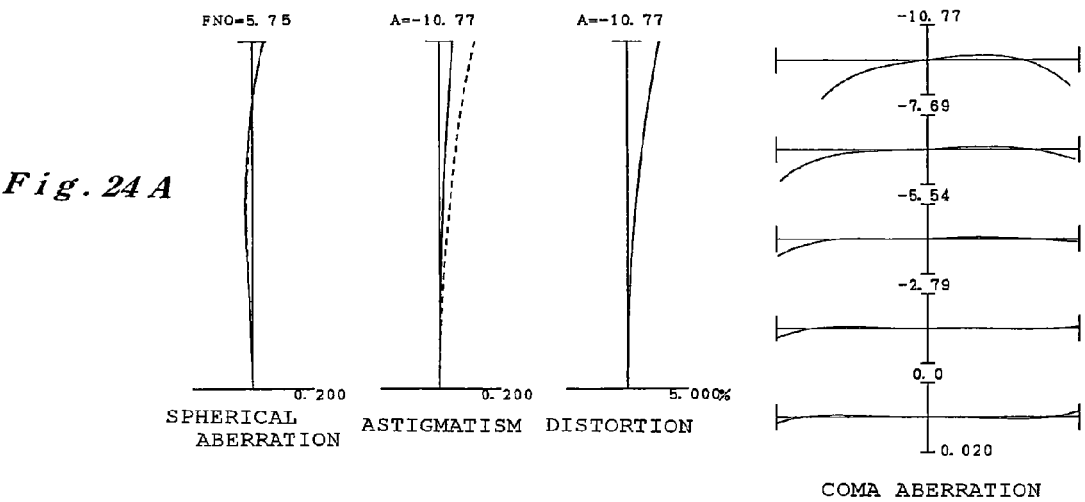
FIG. 24A is a graph showing various aberrations of the zoom lens according to Example 5 upon focusing on infinity in the telephoto end state.
Figure 24B:
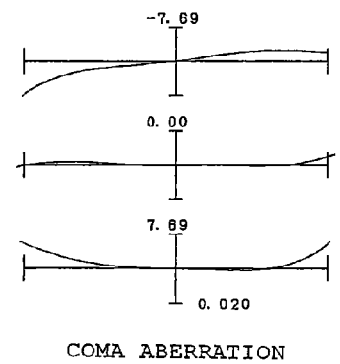
FIG. 24B is a lateral aberration graph during lens shifting in the telephoto end state according to Example 5.

FIGS. 22 to 24 are graphs showing various aberrations of Example with respect to d-line (wavelength λ=587.6 nm). That is, FIG. 22A is a graph showing various aberrations of the zoom lens according to Example 5 focusing on infinity in the wide-angle end state (f=4.76 mm); FIG. 22B is a lateral aberration graph during lens shifting in the wide-angle end state according to Example 5; FIG. 23A is a graph showing various aberrations of the zoom lens according to Example 5 focusing on infinity in the intermediate focal length state (f=10.90 mm); FIG. 23B is a lateral aberration graph during lens shifting in the intermediate focal length state according to Example 5; FIG. 24A is a graph showing various aberrations of the zoom lens according to Example 5 focusing on infinity in the telephoto end state (f=13.60 mm); and FIG. 24B is a lateral aberration graph during lens shifting in the telephoto end state according to Example 5. Further, as is evident from the respective aberration graphs, it is clear that, according to Example 5, the various aberrations are favorably corrected in the respective focal length states from the wide-angle end state to the telephoto end state and Example 5 possesses superior image formation performance.

The following content can be suitably adopted for the above examples within a range that does not impair the optical performance.

Although a four-group constitution is shown for the zoom lens in each of the above examples, as long as the first lens group has positive refractive power, the present invention can also be applied to other group constitutions such as three or five group constitutions. In the case of a five group constitution, examples include a constitution having a positive, negative, positive, positive, and positive group constitution in that order from the object or a constitution which has a positive, negative, positive, negative, and positive group constitution in that order.

Moreover, by moving a single lens group or a plurality of lens groups or a partial lens group in the direction of the optical axis, a focusing lens group that focuses on objects ranging from infinite objects to short-range objects may be established. The focusing lens group can also be applied to autofocus and is also suited to the driving of an autofocus motor (using an ultrasound motor or the like). In particular, the focusing lens group is preferably the second or fourth lens group.

Moreover, by moving the lens group or the partial lens group in a direction that is perpendicular to the optical axis, a vibration-proof lens group that corrects image shake caused by hand shake may also be produced. In particular, the second lens group or the third lens group is preferably rendered a vibration-proof lens group.

In addition, the respective lens surfaces may be aspherical surfaces. Here, an aspherical surface which is produced by grinding, a glass mold aspherical surface produced by forming glass in an aspherical shape in a mold, or a composite aspherical surface produced by forming resin in an aspherical shape on the surface of glass is possible.

Furthermore, the aperture stop is preferably disposed in the third lens group or close to the third lens group. However, instead of providing an aperture stop member, the role of the aperture stop may also be replaced with a lens frame.

In addition, an antireflection film with a high transmittance over a wide bandwidth can be provided on each lens surface in order to be able to achieve a high optical performance which achieves a high contrast and reduces flare and ghosting.

Although the constitutional requirements of this example were described in order to explain the present invention in a way that facilitates understanding, it goes without saying that the present invention is not limited to these constitutional requirements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens having a plurality of lens groups which are disposed in order from an object, wherein a first lens group that is disposed closest to the object among the plurality of lens groups has positive refractive power and comprises a light path bending element which bends the path of light and a plurality of separate lenses which are disposed closer to the object than the light path bending element; and,
   at least a portion of a lens group which is disposed closer to an image than the first lens group is able to move substantially at right angles to an optical axis as a shift lens group, and
   wherein the field of view in the wide-angle end state is equal to or more than 75 degrees.

2. The zoom lens according to claim 1, wherein lenses are disposed between the shift lens group and an imaging surface, and the following conditional expression $$0.75 < \beta bw \times (1-\beta aw)/(Ymax/fw) < 1.2$$

is satisfied,
   where the lateral magnification of the shift lens group in the wide-angle end state is βaw, the lateral magnification of lenses which are disposed between the shift lens group and an imaging surface in the wide-angle end state is βbw, the focal length of the zoom lens in the wide-angle end state is fw, and the maximum image height is Ymax.

3. The zoom lens according to claim 1, wherein the shift lens group is fixed during zooming from the wide-angle end state to the telephoto end state.

4. The zoom lens according to claim 1, wherein the shift lens group has a plurality of separate lenses.

5. The zoom lens according to claim 1, wherein the plurality of lens groups comprises, in order from the object, the first lens group, a second lens group having negative refractive power, a third lens group having positive refractive power, and a fourth lens group having positive refractive power.

6. The zoom lens according to claim 5, wherein the first lens group and the third lens group are fixed during zooming from the wide-angle end state to the telephoto end state; and
   the second lens group and the fourth lens group move along the optical axis during zooming from the wide-angle end state to the telephoto end state.

7. A zoom lens having a plurality of lens groups which are disposed in order from an object, wherein a first lens group that is disposed closest to the object among the plurality of lens groups has positive refractive power and comprises a light path bending element which bends the path of light and a plurality of separate lenses which are disposed closer to the object than the light path bending element;
   at least a portion of a lens group which is disposed closer to an image than the first lens group is able to move substantially at right angles to an optical axis as a shift lens group, and,
   wherein, among the plurality of lens groups, an aperture stop is provided next to an image of a lens closest to the object in the lens group which comprises the shift lens group.

8. The zoom lens according to claim 1, wherein, among the plurality of lens groups, an aperture stop is provided at the object side of the lens closest to the object in the lens group which comprises the shift lens group.

9. The zoom lens according to claim 1, wherein, the following conditional expression $$0.2 < fw/fs < 0.5$$

is satisfied,
   where a focal length of the zoom lens in the wide-angle end state is fw and a focal length of the whole lens group which comprises the shift lens group among the plurality of lens groups is fs.

10. The zoom lens according to claim 1, wherein, the following conditional expression $$L1/Lp < 1.0$$

is satisfied,
   where a distance on an optical axis from a surface closest to the object in the first lens group to a surface closest to the object in the light path bending element is L1 and a distance on the optical axis of the light path bending element is Lp.

11. The zoom lens according to claim 1, wherein the plurality of separate lenses consists of two lenses.

12. The zoom lens according to claim 1, wherein the plurality of lenses consists of all negative lenses.

13. The zoom lens according to claim 1, wherein, the following conditional expression $$ndp > 1.80$$

is satisfied,
   where the light path bending element is a prism and the refractive index of d-line of the prism is ndp.

14. The zoom lens according to claim 1, wherein the plurality of lens groups comprises four lens groups.

15. An optical apparatus equipped with the zoom lens according to claim 1.

16. A method for forming an image of an object that uses a zoom lens which has a plurality of lens groups which are disposed in order from the object to form an image of an object on a predetermined surface, wherein
   a first lens group which is disposed closest to the object among the plurality of lens groups is afforded positive refractive power;
   the first lens group is provided with a light path bending element which bends the path of light and a plurality of separate lenses are disposed closer to the object than the light path bending element;
   at least a portion of a lens group which is disposed closer to the image than the first lens group is able to move substantially at right angles to an optical axis as a shift lens group, and
   wherein the field of view in the wide-angle end state is equal to or more than 75 degrees.

17. The method according to claim 16, wherein lenses are disposed between the shift lens group and an imaging surface, and the following conditional expression $$0.75 < \beta bw \times (1-\beta aw)/(Ymax/fw) < 1.2$$

is satisfied,
   where the lateral magnification of the shift lens group in the wide-angle end state is $\beta aw$, the lateral magnification of lenses which are disposed between the shift lens group and the imaging surface in the wide-angle end state is $\beta bw$, a focal length of the zoom lens in the wide-angle end state is fw, and the maximum image height is Ymax.

18. The method according to claim 16, wherein the shift lens group is fixed during zooming from the wide-angle end state to the telephoto end state.

19. The method according to claim 16, wherein
   the plurality of lens groups comprises, in order from the object, the first lens group, a second lens group, a third lens group, and a fourth lens group,
   the first lens group and the third lens group are fixed during zooming from the wide-angle end state to the telephoto end state, and
   the second lens group and the fourth lens group move along the optical axis during zooming from the wide-angle end state to the telephoto end state.

20. The method according to claim 16, wherein, the following conditional expression $$0.2 < fw/fs < 0.5$$

is satisfied,
   where a focal length of the zoom lens in the wide-angle end state is fw and the focal length of the whole lens group which comprises the shift lens group among the plurality of lens groups is fs.

21. The method according to claim 16, wherein, the following conditional expression $$L1/Lp < 1.0$$

is satisfied,
   where a distance on the optical axis from the surface closest to the object in the first lens group to a surface closest to the object in the light path bending element is L1 and the distance on the optical axis of the light path bending element is Lp.

22. The method according to claim 16, wherein the plurality of lenses consists of two lenses.

23. The method according to claim 16, wherein the plurality of lenses consists of all negative lenses.

24. The method according to claim 16, wherein, the following conditional expression $$ndp > 1.80$$

is satisfied,
   where the light path bending element is a prism and the refractive index of d-line of the prism is ndp.

25. A zoom lens having a plurality of lens groups which are disposed in order from an object, wherein a first lens group that is disposed closest to the object among the plurality of lens groups has positive refractive power and comprises a light path bending element which bends the path of light and a plurality of separate lenses which are disposed closer to the object than the light path bending element;
   at least a portion of a lens group which is disposed closer to an image than the first lens group is able to move substantially at right angles to an optical axis as a shift lens group, and,
   wherein the plurality of lenses consists of all negative lenses.

26. A method for forming an image of an object that uses a zoom lens which has a plurality of lens groups which are disposed in order from the object to form an image of an object on a predetermined surface, wherein
   a first lens group which is disposed closest to the object among the plurality of lens groups is afforded positive refractive power;
   the first lens group is provided with a light path bending element which bends the path of light and a plurality of separate lenses are disposed closer to the object than the light path bending element;
   at least a portion of a lens group which is disposed closer to an image than the first lens group is able to move substantially at right angles to an optical axis as a shift lens group, and,
   wherein the plurality of lenses consists of all negative lenses.

* * * * *